US006984670B2

(12) United States Patent
Meyers, III et al.

(10) Patent No.: US 6,984,670 B2
(45) Date of Patent: Jan. 10, 2006

(54) RECYCLABLE COMPOSITE MATERIALS ARTICLES OF MANUFACTURE AND STRUCTURES AND METHOD OF USING COMPOSITE MATERIALS

(75) Inventors: John J. Meyers, III, Penfield, NY (US); John H. Swartz, Coraopolis, PA (US); Nathaniel G. Kurczewski, Moon Township, PA (US); Matthew J. Kurczewski, Moon Township, PA (US)

(73) Assignee: Ace Tire & Parts, Inc., Coraopolis, PA (US)

( * ) Notice: Subject to any disclaimer, the term of this patent is extended or adjusted under 35 U.S.C. 154(b) by 0 days.

(21) Appl. No.: 10/470,750

(22) PCT Filed: Aug. 12, 2003

(86) PCT No.: PCT/US03/23259

§ 371 (c)(1),
(2), (4) Date: Aug. 12, 2003

(87) PCT Pub. No.: WO2005/019332

PCT Pub. Date: Mar. 3, 2005

(65) Prior Publication Data

US 2005/0035484 A1 Feb. 17, 2005

(51) Int. Cl.
*C08J 11/04* (2006.01)

(52) U.S. Cl. ......................... 521/40; 521/40.5; 521/41; 521/45.5

(58) Field of Classification Search .................. 521/40, 521/40.5, 41, 45.5
See application file for complete search history.

(56) References Cited

U.S. PATENT DOCUMENTS

| | | | | |
|---|---|---|---|---|
| 3,640,912 A | | 2/1972 | Reinhard et al. | |
| 4,028,288 A | | 6/1977 | Turner | |
| 4,110,420 A | | 8/1978 | Turner | |
| 4,111,584 A | | 9/1978 | Fyfe | |
| 4,125,578 A | | 11/1978 | Sear | |
| 4,160,761 A | | 7/1979 | Prusinski et al. | |
| 4,250,222 A | | 2/1981 | Mavel et al. | |
| 4,358,554 A | | 11/1982 | Yan et al. | |
| 4,396,566 A | | 8/1983 | Brinkmann et al. | |
| 4,427,818 A | | 1/1984 | Prusinski | |
| 4,795,603 A | | 1/1989 | Nagayasu | |
| 4,815,891 A | | 3/1989 | O'Connor | |
| 4,826,638 A | | 5/1989 | Hopperdietzel | |
| 4,968,463 A | | 11/1990 | Levasseur | |
| 4,970,043 A | | 11/1990 | Doan et al. | |
| 5,092,706 A | | 3/1992 | Bowen et al. | |
| 5,106,554 A | | 4/1992 | Drews | |
| 5,114,648 A | | 5/1992 | Kuc, Sr. | |
| 5,116,653 A | | 5/1992 | Frandina | |
| 5,145,285 A | | 9/1992 | Fox et al. | |
| 5,151,230 A | | 9/1992 | Damberg | |
| 5,217,655 A | | 6/1993 | Schmidt | |
| 5,221,702 A | | 6/1993 | Richards | |
| 5,238,633 A | | 8/1993 | Jameson | |
| 5,244,304 A | | 9/1993 | Weill et al. | |
| 5,264,640 A | | 11/1993 | Platz | |
| 5,292,467 A | * | 3/1994 | Mandish et al. | 264/112 |
| 5,298,214 A | | 3/1994 | Morrow et al. | |
| 5,312,573 A | | 5/1994 | Rosenbaum et al. | |
| 5,316,708 A | | 5/1994 | Drews | |
| 5,423,236 A | | 6/1995 | Daly | |
| 5,426,900 A | | 6/1995 | Springer | |
| 5,439,313 A | | 8/1995 | Blaha et al. | |
| 5,439,735 A | | 8/1995 | Jamison | |
| 5,456,872 A | | 10/1995 | Ahrweiler | |
| 5,468,431 A | | 11/1995 | Helling | |
| 5,468,436 A | | 11/1995 | Kirtland | |
| 5,523,328 A | * | 6/1996 | Rosenbaum et al. | 521/41 |
| 5,534,207 A | * | 7/1996 | Burrus | 264/150 |
| 5,569,424 A | | 10/1996 | Amour | |
| 5,585,122 A | | 12/1996 | Drum et al. | |
| 5,624,620 A | | 4/1997 | Turner | |
| 5,628,152 A | | 5/1997 | Bowman | |
| 5,656,720 A | | 8/1997 | Schlueter, Jr. et al. | |
| 5,657,597 A | | 8/1997 | Loftus | |
| 5,660,775 A | | 8/1997 | Kasahara et al. | |
| 5,676,895 A | | 10/1997 | Toivola et al. | |
| 5,722,589 A | | 3/1998 | Richards | |

(Continued)

OTHER PUBLICATIONS

WWW.babcocklumber.com/xpotent.html (May 2002).*

*Primary Examiner*—Edward J. Cain
(74) *Attorney, Agent, or Firm*—Robert J. Webster; Birch, Stewart, Kolasch & Birch, LLP

(57) ABSTRACT

Composite mixture materials made of recycled plastic, glass and rubber, and optionally, sand, gravel, coal combustion by-product and metal, and containing no petroleum distillates (unless a fire retardant or recycled asphalt pavement is used) are disclosed. Methods of using the composite mixture materials include making expansion joints in pavement, filling manhole cover recesses, filling potholes in pavement, making new pavements, and making panels, walls, blocks, impact protection walls, and other such structures. Methods of making the composite mixture materials include heating the components of the material in an inert gas environmentally friendly manner. Compressive pressure is applied to composite mixture materials used in making expansion joints, manhole cover recess fillers, and in filling potholes to build in an elastic strain to overcome both a composite material shrinkage on cooling solidification of the material and the thermal contraction of pavements, and in making the composite material for any other of the uses disclosed.

57 Claims, 16 Drawing Sheets

U.S. PATENT DOCUMENTS

| | | | |
|---|---|---|---|
| 5,724,783 | A | 3/1998 | Mandish |
| 5,800,752 | A | 9/1998 | Charlebois |
| 5,827,008 | A | 10/1998 | Smith et al. |
| 5,830,396 | A | 11/1998 | Higgins et al. |
| 5,861,117 | A | 1/1999 | Rosenbaum |
| 5,891,955 | A | 4/1999 | Mariani et al. |
| 5,947,634 | A | 9/1999 | Robillard |
| 6,004,122 | A | 12/1999 | Terajima |
| 6,017,970 | A | 1/2000 | Chen |
| 6,068,804 | A | 5/2000 | Betzner et al. |
| 6,224,809 | B1 | 5/2001 | Orndorff, Jr. |
| 6,322,863 | B1 | 11/2001 | Kubicky |
| 6,362,257 | B1 | 3/2002 | Chehovits et al. |
| 6,485,639 | B1 | 11/2002 | Gannon et al. |
| 6,488,766 | B2 | 12/2002 | Balkum |
| 6,766,963 | B2 * | 7/2004 | Hansen ........................ 238/84 |

* cited by examiner

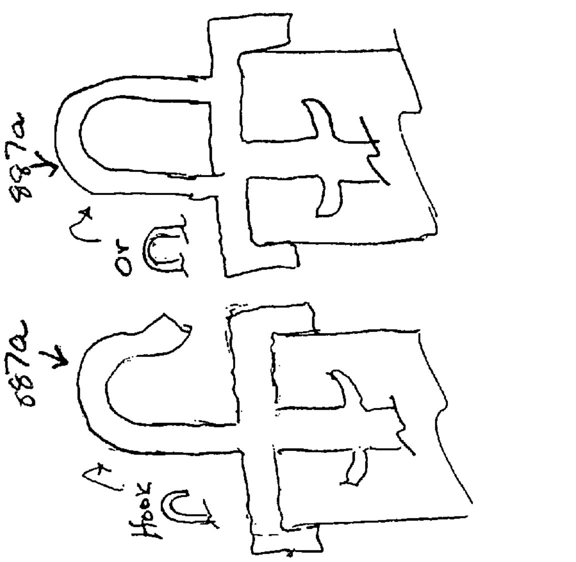
FIG. 8O
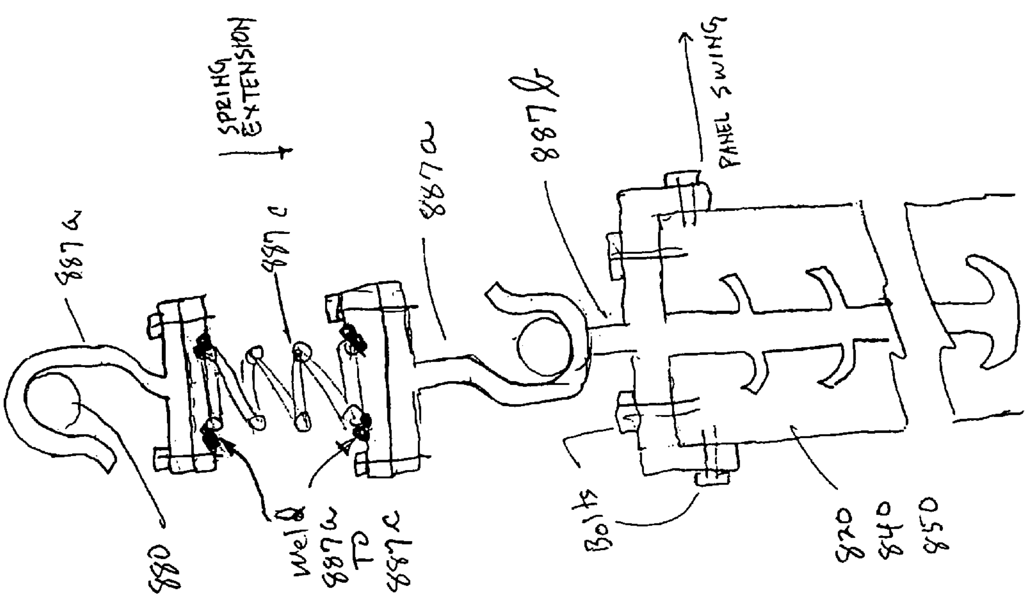
FIG 8-N

RECYCLABLE COMPOSITE MATERIALS ARTICLES OF MANUFACTURE AND STRUCTURES AND METHOD OF USING COMPOSITE MATERIALS

This Application is a continuation-in-part of PCT/US02/15160, filed on Jun. 14, 2002, with respect to which the United States is a designated state, benefit of which is claimed under 35 USC §120.

BACKGROUND OF THE INVENTION

1. Field of Invention

This invention relates to a composite material comprising recyclable rubber, glass and polymeric materials and optimally containing some coal combustion by-product, both fiberglass and asphalt roof/siding shingles, recyclable metals, virgin sand, small stones, gravel and the like. The invention also relates to the manufacturing process of the material, articles of manufacture using the composite material, and other methods of using composite materials. The listed composite constituents are employed in various compositions and with somewhat varied processed parameters, depending upon the intended application/use; thus, it is to be recognized the composite material will encompass an assortment of composite materials as disclosed in this document.

2. Description of Related Art

Composite materials used for building products and for pavement, including pavement repair and expansion joints for pavements, typically include petroleum products, including asphalt and recycled tires. The methods of manufacturing and using petroleum products are not in general environmentally friendly.

The new composite material contains no petroleum products or chemical additives such as, for example, asphalt, such as are used in asphalt pavements, and serves to reduce growing rubbish and trash disposal problems caused by disposal items such as, for example, coal-combustion by-product, automobile tires, glass, plastic and/or glass containers, including bottles, etc. The manufacturing process that produces the composite material involves some heating done within an inert gas atmosphere to reduce environmental air pollution and prevent weakening the constituent polymers by oxidation, thereby weakening the composite mixture material. Further, the heating process requires raising the temperature of all the composite materials to about 500° F. which sanitizes the recycled materials against bacteria.

Similar composite materials are also known. One example of such similar composite materials is shown in U.S. Pat. No. 6,224,809 being used for automotive bumpers. This material is disclosed as an elastomer together with a plastic alloy blend and of elastomer and preferably, crumb rubber, held together by a matrix of a thermoplastic polyethylene. Accordingly it, and other similar patents, use new, non-recycled chemical compounds and materials derived from petroleum.

SUMMARY OF THE INVENTION

One aspect of the methods and materials according to this invention include a new composite material using recyclables (glass, polymers, plastics, rubber, both fiberglass and asphalt roof/siding shingles, coal combustion by-products, metals) and that does not contain, newly added, petroleum products or new, non-recycled chemicals. The roof/siding shingles add a source of small stone grit and further add some recycled source of asphalt not necessary for this invention, but is acceptable since it has been recycled. Some prior used materials, for example, certain sand and gravel can be added to impart certain situation specific characteristics and properties such as, for example, surface texture, surface friction, material density (which do not significantly affect the resilience to breakage of the composite mix material). Occasionally, if desired, or absolutely needed, chemicals such as, for example a fire retardant chemical to further reduce the susceptibility of the material to burn, or colorant(s),for example to affect the appearance of the composite mix material can be added. The material according to this invention is normally made entirely from recyclable materials, and may be used for methods of making repairs in pavements, including concrete and asphalt pavements. The composite material of this invention may be used to fill potholes in asphalt and concrete pavement, fill manhole cover recesses, to make expansion joints in roadways, and in building materials, such as, for example, building blocks, structural panels and other structural elements including pipes and fixtures. The structural and energy absorbing properties of the material, including damping out shock waves caused by impacts of an object onto a structure made with the composite material and flexibility of the composite material, make it suitable as a protective barrier to prevent serious physical damage to structures, including buildings, water dams, nuclear facilities, defense structures, bridge support structures, piers, factories, defense structures, airplane cargo bays, any critical infrastructure, and the like. The materials of this invention may be used in any of the aforementioned structures in above and/or below water locations.

In its most general terms, the material of the present invention can be used as a repair or filler material. In these uses, the material is filled into a recess such as a crack, crevice, pothole, indentation, excavation, joint, cavity or the like to a suitable level, and is allowed to cool under sufficient compressive force. The compressive force is preferably sufficient to build in a significant elastic strain, i.e., an elastic strain which significantly reduces and/or avoids polymer shrinkage and material contraction during cooling and to thus prevent crack formation around the periphery of the material. The rate of cooling is variable and can be relatively rapid or relatively slow. These same principles can be applied when using the material as a bulk paving product or when using the material to form other structural materials. That is, the material is applied in a melted state, and a compressive force is applied to the material as the material cools, prior to and during its solidification. The significant elastic strain that is built into the composite material (1) overcomes and/or compensates for polymer shrinkage in a molding process application of the composite material; (2) maintains tight contact of the composite material with pavement, or other materials and/or material surfaces when used as an expansion joint material if the other surfaces shift apart and/or thermally change dimension due to, for example, temperature changes; (3) promotes self healing of the composite material after the material is physically penetrated, such as, for example, scored, scratched, or gouged; and (4) increases impact strength tolerance of the composite material. Values of such elastic strains fall within the range of the applied manufacturing compressive stress.

Another aspect of the materials and systems and methods that involves a heating step in manufacture, according to the invention is that the composite materials of the invention may be heated in an inert atmosphere to reduce the possibility of any chemical reactions to thereby reduce environmental air contamination, as well as to reduce degradation of recycled component rubber and plastic material constituents of the composite material. The heating also sanitizes the composite mixture material against bacteria.

Another feature and advantage of the invention is that the composite material is not limited to using a particular polymer or specific types of polymers, but can use any number of assorted recycled polymers, and does not need to use filament binders or adhesives or other specific binders. The composite materials according to the invention use assorted recycled multi-polymer composition content to hold together the composite material. Moreover, the percentage of the ingredients can be tailored to a particular use.

These and other features and advantages of the invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein:

FIGS. 4B–4K are diagrammatic side elevational views of exemplary embodiments of methods and a system for forming an expansion joint according to the invention;

FIGS. 8N–8O are views various exemplary embodiments of pivots supports for various protective wall embodiments according to this invention.

Figure 1:
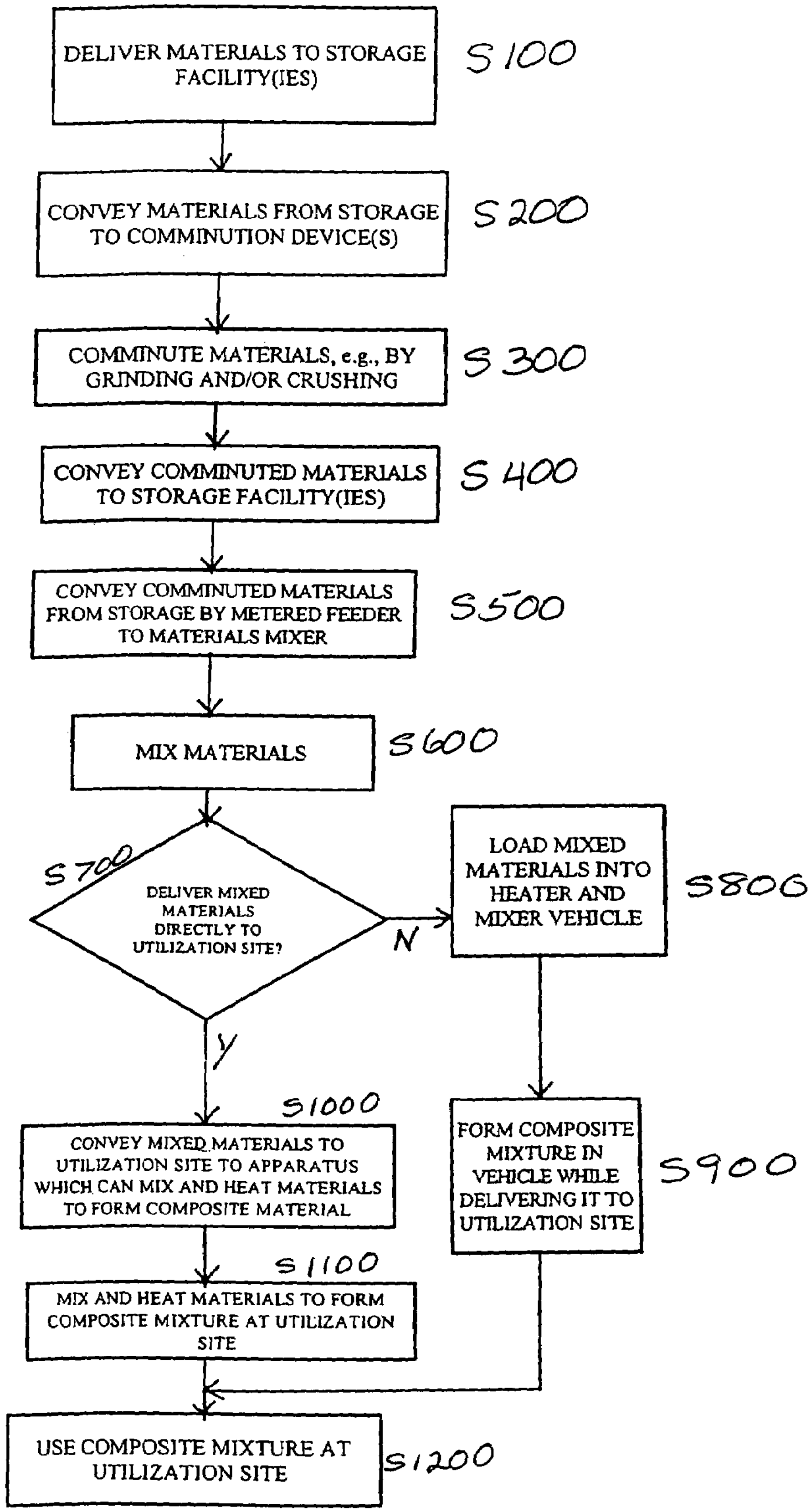
FIG. 1 is a flow chart of exemplary embodiments of methods of making the composite materials of this invention.

The present invention is directed in particular to a composite material that is suitable for a wide range of uses, including pavement repair, full pavement area application, asphalt and concrete repair, joint expansion filler, building material uses, wall and panel uses, fixture materials, piping materials, other building materials, and the like. The material provides significant environmental benefits, in terms of its composition of using all recycled materials and its manufacture within an inert atmosphere, and it also provides waste disposal savings and cost and time savings in its various uses and applications.

According to the present invention, the material is made substantially entirely of recycled materials. Such recycled materials can be either post-consumer use materials or can be materials from industrial sources. In the post-consumer use context, the constituent materials can include, for example, but are not limited to: polymer/plastics materials, such as from bottles, jars, containers, wrappings, household items, children's toys, and the like; glass materials, such as from bottles, jars, window panes, and the like; and rubber materials, such as from tires, mats, and the like. Similar materials from industrial sources can likewise be used. These materials preferably form a bulk of the material of the present invention. Thus, for example, these materials may be provided in an amount of about 50% by volume of the polymer/plastic material, about 35 percent of the rubber material and about 15% of glass material. Other containment amounts may be used for special applications.

When the plastics, glass and rubber materials are used, it is preferred that the materials be recycled materials. Such use provides one of the benefits of the present invention of increasing recycling of consumer and industrial materials. Such recycled materials can be collected and processed post-consumer materials, such as are commonly collected and processed from household and office recycling programs. Alternatively, or in addition, the recycled materials can be collected and processed from industrial uses, such as scrap, leftover, and the like materials.

In addition, the material of the present invention can include a desirable amount of other recycled or non-recycled environmentally friendly material. For example, the material can include an amount of one or more materials selected from sand, stone, gravel, and the like. Such materials can be included, for example, to provide texture, appearance and/or other properties such as additional compressive strength and surface friction and color to the final product, and the like. In embodiments, these materials can also be recycled materials. For example, the sand, grit, stone or gravel can be obtained by crumbling used concrete, e.g., road slab concrete or by using road stone, or other materials. However, as desired, these materials can also be "virgin" or non-recycled materials. Furthermore recycled roof/siding asphalt and fiberglass shingles, coal combustion by-products, including, for example, coal ash, have proven to be useful additives to the composite material. If desired, coal combustion by-product can be used in all of the composite mix applications set forth in this disclosure. While coal combustion by-product is weaker in strength than stone and gravel, its strength is comparative with sand and it is cost competitive with sand, and aids in overall binding and filling in voids.

An aspect of the present invention, in certain exemplary embodiments, is that the material is completely free of adding any new petroleum products. Thus, for example, the composite material of the present invention is completely free of such materials as asphalt or tar, and new petroleum-containing or petroleum based products are not added during the compounding and/or manufacturing processes.

In another aspect of the present invention, in certain exemplary embodiments thereof, the material is essentially free of, i.e., contains at most trace or minor amounts of, any such petroleum-based or petroleum containing products. In these embodiments, the composite material of the present invention can include minor amounts of such petroleum products. For example, trace or minor amounts of petroleum products can be included, typically as being already part of one or more of the constituent recycled materials. For example, the composite material of the present invention can be formed using recycled materials such as, old tires, roof/siding shingles, asphalt, including crumbled asphalt, and the like, which recycled materials may, and often do, include petroleum products. It is preferred that additional separate petroleum-based or petroleum-containing products are not added except as discussed below, in paragraph [0017]. When such petroleum-containing recycled products are used, such petroleum-based or petroleum-containing products are not considered to be newly added to the composite material, and do not contribute to the characteristics of the composite materials.

However, in other embodiments of the present invention, it may be desirable to add small amounts of non-recycled material including petroleum-based or petroleum-containing material, such as, for example, sand, gravel, metal or a conventional fire retardant in order to provide desirable properties to improve characteristics of the composite mix and to increase the environmentally friendly aspects of the invention. For example, a conventional flame retardant added to the composite material which provides safety characteristics and reduction of air pollution would be considered to be within the scope of the invention of composite mixtures which consists essentially of recycled materials.

FIG. 1 shows a diagram of exemplary facilities, equipment and processes which can be used to manufacture the composite material of this invention. To begin with, in step S100, the rubber, glass, polymer material and/or any other materials are delivered to storage. In step S200, these materials are conveyed to a comminution device to be ground and/or crushed to reduce them to small particles. Next, in step S300, the recyclable materials such as the rubber, roof/siding shingles, any crushed coal combustion by-product, glass and polymer material are comminuted to an appropriate size. Then, in step S400, all of these ground and crushed materials as well as the sand and the gravel are conveyed to storage. Thereafter, in step S500, the stored materials are conveyed by a metered feeder to a mixer to mix all of the aforementioned materials, that is, the recycled materials and any virgin materials. In step S600, the materials are mixed to form a relatively dry mix. Then a decision is made in step S700 to convey the materials directly to the site before heating and further mixing the mix components, or not. If so, the materials are conveyed in step S1000 to a utilization site where the materials are further mixed and heated in step S1100 on site to form the composite mixture. If not, one proceeds to step S800 to load the mixed constituent materials into a mixer and heater vehicle and, in step S900, to heat and mix the materials in the vehicle enroute to a utilization site. Steps S1000 and S1100 may employ a mixer that may be a portable, non-heated mixer as one sees in normal concrete mixing delivery trucks that would deliver this product to another heated mixer which is set up on a particular site so that the polymer may be further mixed and heated at the site. Steps S800 and S900 may employ a special mixer and heating truck unit for delivery to the site.

Then, in step S1200, the composite mix is used to, for example, make structures or structural elements, and/or repair potholes, make full pavements, and/or form expansion joints. The forming may involve a compression step, as disclosed, infra.

Of course, as will be readily apparent to one skilled in the art, the processes of the present invention are not limited to that shown in FIG. 1, and the process steps shown therein are exemplary only. Thus, for example, it will be apparent that the storage, conveying, and comminuting steps S100–S500 are optional. For example, if the recycled and/or virgin raw materials are obtained in an already comminuted state, ground or otherwise provided at the desired particle size, then the comminuting steps will be unnecessary.

Likewise, it will be apparent that the storage and conveying steps may be unnecessary, particularly in large volume applications where the recycled and/or virgin raw materials are obtained directly from one or more suitable sources and are processed immediately within any intervening storage steps. Under appropriate circumstances, the recycled and/or virgin raw materials may be processed directly from their source into the stated mixing operation without the need to store or transport them.

Still further, it will be apparent that the mixed material need not be conveyed or shipped to the site of actual use, such as by a non-heated or heated mixing vehicle. Rather, in embodiments, it will be apparent that any of the described process steps, including one or more of the storage, conveying, comminuting, and/or mixing operations can be conducted at the actual site of use of the resultant composite material. In these embodiments, one or more of the process steps can be conducted, and the material exiting from the mixer can be directly applied to its desired use.

Still other modification of the describes processes will be apparent to one skilled in the art based on the present disclosure. Such modified processes are also within the scope of the present invention.

The composite mixture is solidified by cooling, which may be forced cooling and/or natural cooling in a relatively cool ambient atmosphere.

Moreover, a single formulation temperature and application method can be used for both summer and winter conditions, but the temperature of the mixed components can be slightly varied in weather conditions such as occur in winter and summer.

Also, additional materials may be added to the mix such as recyclable metal filings or ground up metals such as, for example, from tire steel reinforcement belts. Many other of metals may be used in the composite mixture, including, for example, iron, steel, stainless steel, copper, brass, aluminum, etc. When added to the mix formulation, metals will increase the thermal conductivity of the mix and thereby shorten the cooling time. Also, when using metals in a composite mix material for use in piping, for example, a metal detector may be used to trace hidden pipes such as underground piping.

Another aspect of the materials and systems and methods according to the invention is a further reduction of environmental/air contamination by using hydrogen as the fuel source for heating the composite material constituents, to release only water vapor into the environment. If desired. the water vapor can be condensed into liquid water to furnish an additional source of heat, i.e., the heat of condensation of the water vapor.

Another aspect of the systems and materials and methods according to the invention relate to pothole repair. In these embodiments, the heated mixture of constituents mainly includes recyclable rubber, glass and melted polymer materials, but also may contain some recyclable metals, coal combustion by-product, roof/siding shingles, virgin sand, small stones and/or gravel. The composite material is filled into a pothole and solidly compacted using a force-loaded cover plate at a compressive pressure of about 10–30 lbs. per square inch until the melted polymer material re-solidifies. A reinforcement element or elements may be inserted in the pothole, before, during or immediately after insertion of the melted composite mix material into the pothole but, prior to solidification and hardening of the composite material.

Characteristics of the composite mixture for potholes or other voids according to this invention include suitability for a wide range of weather conditions, including freezing and thawing weather conditions, low permeability to and high tolerability of snow, ice, water, oil, gasoline, salt (both sodium and calcium chloride), flexibility to accommodate expansion and contraction with relatively low material stress levels, relatively high adhesive strength to concrete and asphalt highway construction materials, relatively long life expectancy, high impact resistance and strength following cure, long life storage for composite mix components, viscosity and flow properties suited to enable surface leveling of final composite mix after filling the hole small or large surface voids, cracks, tunnels, uneven contours, spalled surfaces; applicable to wet, dry and dusty surfaces, relatively low shrinkage during cure, capable of being reinforced if desired, and relatively rapid cure rate and time, which may be altered in many ways, including by the use of catalysts.

Another aspect of the materials and methods and systems according to the invention is that compressive loading not only produces a solid fill but also introduces elastic strain that overcomes shrinkage that might otherwise result in one or more cracks forming at the edges of the pothole. A compressive loading is also applied when the material is used to make pavement expansion joints, but the loading is increased to about 150 lbs. per square inch.

Another aspect of the systems and methods according to the invention is that, when used in full pavement areas or when making building materials, fixtures, piping and other structures, pavement forms or molds will be used such that the dimensions of the form or the mold element can be increased to allow for shrinkages. Also for these applications, a lower compressive force can often be tolerated.

Another aspect of the systems and methods of this invention includes the benefits and possibilities of employing different composite material mixtures to optimize its properties for each specific application.

Of course, the content ranges of the composite mix disclosed in this application are exemplary only, and the present invention is not limited to those stated ranges. Rather, one of ordinary skill in the art will be readily able to modify the content ranges for specific uses in view of the present disclosure.

One exemplary embodiment of the composite materials of this invention includes the following recyclable materials and contains the following volume percentage ranges:

a. Polymers/plastics 40% to 60% including all commonly used low and high density polyethylene, polystyrene, polyvinyls, polypropylene, polyurethane, acrylics, polyethyleneterepthalate and others;
b. about 10% to about 20% glass from bottles and other glass items;
c. about 25% to about 50% of rubber from tires, or other sources of rubber;
d. about 5% to about 15% sand and/or roof or siding shingles;
e. about 5% to about 15% small stones/gravel and/or coal combustion by-product;
f. about 2% to about 5% metal.

For any particular composite mix, the total volume percentage of all components is 100%. According to the systems and methods and materials of this invention, one exemplary embodiment of a composite mix is about 45% polymers, about 15% glass, about 25% rubber, about 5% sand and about 10% small gravel. According to another exemplary embodiment of the composite materials according to this invention, a mix contains about 50% polymers, about 40% rubber and about 10% glass with no sand or gravel. A third exemplary embodiment of the composite materials according to this invention uses about 50% polymers, about 35% rubber, about 10% glass, and about 5% coal combustion by-product. A fourth exemplary embodiment of the composite materials according to this invention uses about 50% polymers, about 30% rubber, about 10% glass, about 5% coal combustion by-product and about 5% roof/siding shingles. Many other combinations are possible within the spirit and scope of the teachings of this invention. The actual mix combination used is tailored to various specific applications such as repairing fine cracks, large cracks, shallow/spalling damage, large and deep potholes, and the like, and the mix may be tailored to adapt to specific weather, loading and desired texture considerations.

According to the systems and methods of the invention, preparation of the composite material involves pre-shredding each component into small chips and/or fine granules, thoroughly mixing the pre-shredded components together and heating them to the melt point of the highest melt polymer component, which illustratively may be between 450° and 500° F. This heating temperature range also sterilizes the composite mixture against bacteria. According to the systems and methods of the invention, to avoid environmental air contamination with reaction products generated with burning fuels to generate heat for melting the composite mix material, hydrogen may be employed as the combustion fuel. The resulting reaction gas is water vapor for discharge to the atmosphere. The water vapor may be condensed into liquid water and discharged to waste or to another use. If desired, the combustion water vapor product is condensed to recover its heat of vaporization for any purposes. Moreover, where electrical energy is needed, a hydrogen operated fuel cell may be used, or hydrogen may be burned to generate hot air or steam to drive an electrical generator.

During the melting of the composite mix materials, the heating process may be carried out within an inert, e.g., nitrogen or argon, gas atmosphere to prevent any material oxidation products from forming, thus avoiding material degradation of the product as well as avoiding air pollution.

The composite mix material also has the characteristic of being reusable. This means that any of the material if applied to a specific use such as, for example, pavement is removed for any reason, the material does not have to be disposed of. The material can be reused for any new application of the composite mixture.

According to the systems, methods and materials of this invention, one use of the composite material of this invention is to fill potholes and make other repairs in concrete and asphalt pavement, as well as for use in manufacturing other building materials, structures and piping. With respect to highways and other pavements, this invention may be used to repair damage needed at all concrete and asphalt surface pavements that are subject to weathering, thermal and mechanical loading, auto lubricants and fuels, de-icing chemicals and abrasive wear. The material may also be used as a sealant filler for pavement and other expansion joints. Some examples of uses of this material include repairing concrete and asphalt highways, roads and streets, concrete and asphalt airport runways, concrete and asphalt parking lots, concrete and asphalt athletic surface pavements, as well as concrete and asphalt sidewalks. It also can be used as the primary construction material for these pavement applications. Other uses include forming and patching retaining walls, swimming pools, as a substitute for concrete and or cinder building blocks, as a substitute for concrete and/or metal drainage piping, and as a substitute of other structural elements such as panels used in building construction and sound walls along highways and as protective walls for structures against high impact objects.

In its most general terms, the material of the present invention can be used as a repair or filler material. In these uses, the material is filled into a crack, crevice, pothole, or the like to a suitable level, and is allowed to cool under sufficient compressive force. The compressive force is preferably sufficient to avoid polymer shrinkage and material contraction during cooling and to thus prevent crack or void formation around the periphery of the material. These same principles can be applied when using the material as a bulk paving product or when using the material to form other structural materials. That is, the material is applied in a melted state, and a compressive force is applied to the material as the material cools, prior to and during its solidification. In applying the compressive force to the composite mixture, the force can, if desired, be applied using an embossed pattern on the surface of a force application plate or roller to provide any desired surface design on the composite mixture, e.g., when used for patios, sidewalks or other like applications.

In other embodiments, the same general principles can be applied, except that the material is applied in one or more pre-made solidified shaped forms of the material, plus an amount of melted material to fill void spaces and bond the one or more pre-made forms together and to the surrounding structure. Such pre-made shaped forms can be in various sizes that partially or substantially fill the intended area, or in smaller pebble- or geometrically-shaped pieces. These embodiments are described in further detail below.

Figure 2A:
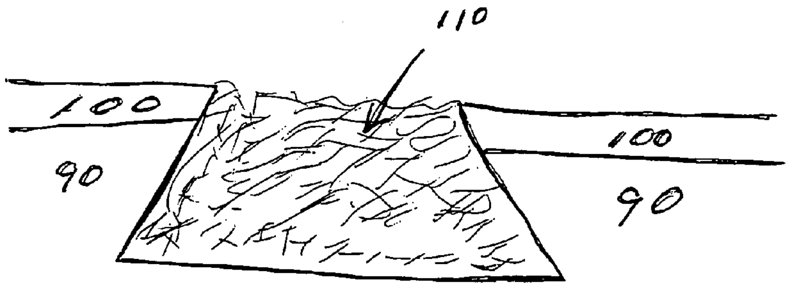
FIGS. 2A and 2B are cross-sectional views of a vertical plane through a pothole to be filled according to the methods and with the materials of this invention.

FIG. 2A shows a pothole in cross-section which has been filled with composite materials of this invention. To prepare a pothole for repair using the materials of this invention, various methods may be employed. In one exemplary method, the pothole surface is first jack hammered, undercut and provided with some shallow pit-holes, as needed, to serve as mechanical lock features for the composite mix fill. Following mechanical removal of all loose or cracked material from the pothole surface plus a thorough clean up, such as, for example, by air blasting, the pothole will be filled with the melted composite mixture 110 to a level slightly above the pavement surface. Next the material will be covered with a Teflon® or similar coated plate to reduce the material from sticking to the plate. The plate is then force loaded to transfer a 10–30 psi compressive pressure to the composite mix as it solidifies and cools. To shorten the cooling time the plate can be cooled by various methods such as application of a cold water spray to plate and/or the composite material. The compressive pressure applied to the material overcomes material polymer shrinkage, which occurs in changing from a liquid to a solid state and in cooling down from the melt temperature. Accordingly, together with the undercuts mentioned above, the final result is a firm, tight mechanical bond of the material to the pothole surface.

One variation to shorten the cycle time for filling potholes includes filling the pothole with a composite mix material and only applying the compressive load until the material is compacted, i.e., not over the full time of solidification of the mixed material. This results in the formation of a very narrow shrinkage crack at the pothole edge. Such a crack is then filled with a fluid mixture of a conventional acrylic latex and powdered recycled rubber, the acrylic latex being nothing more than a rubber compound used in a water-based latex paint. Alternatively, the acrylic latex rubber mixture can be coated on the pothole edges immediately prior to filling in and compacting the composite mix material. Although it may be an hour or more for the fluid-like acrylic latex rubber mixture to air dry, this would not present a problem since a very narrow semi-wet crack can be driven over.

According to the systems and methods and materials of the invention, another exemplary process to greatly reduce process time for potholes uses small size pre-made balls or bricks of the composite mix, which only require a surface area re-melt before feeding them into the pothole, and then compressive loading the balls or bricks until their surfaces are all fused together and solidified. The heat for brick surface re-melting is provided by the heat content of some heated loose composite mix which is filled around the bricks into void spaces remaining in the pot-hole.

In addition, recycled metal filings or small pieces of ground up metal, such as from tire reinforcement belts, can be added to the mix formulation, which will greatly increase the thermal conductivity of the mix and thereby shorten the cooling time. If these metal filings and chips are included in a material used for piping, then a metal detector can be used to trace hidden pipes such as underground pipes.

According to the systems and methods and materials according to the invention, another exemplary process to shorten the compressive load/cooling time comprises pre-coating the pothole surfaces with a thin layer mixture of acrylic latex and powdered rubber, mentioned above, which dries over time and completely seals any residual crack formed by shrinkage in the solidified composite material.

Another aspect of another variation of the method of filling potholes just described is to pre-form composite material blocks or slabs or rods, etc., in an assortment of likely pothole size and shapes such as 6 inch diameter to 24 inch diameter pre-forms with various thickness of anywhere from ½ inch to a foot or more in variations of a half inch or an inch or two inches. Further, similar shapes such as squares or rectangles could be made.

In order to use these pre-made composite mix blocks or slabs or rods, etc., various methods may be employed. An exemplary embodiment of one such method is set forth, as follows. First, use a saw to precut existing pothole configuration into the nearest pre-made composite mix size and shape, for example, a triangular like pothole with 9 inch by 7 inch by 11½ inch dimensions would be cut to a 12 inch diameter circle. The wall cut would be given a beveled taper which increases in diameter from top to bottom by about an inch. This would serve to lock the entire assembly together. Second, fill into the cutout pothole a quantity of fluid mix or hot composite fluid mix of sufficient volume to fill out voids that may remain. Third, either preheat a number of composite mix forms sufficiently to re-melt a thin surface thereof or as mentioned above, use the heat content of heated loose composite mix filled into void spaces and between the forms to melt the surface and insert as many of the pre-made composite mix forms as are necessary into the pothole to completely fill the depth of the pothole. Fourth, apply a 10–30 psi pressure with a force loaded plate to tightly bond together the stack of composite mix forms and to squeeze and compress the fluid hot composite mix into all voids, such as the locking beveled taper on the sidewalls discussed above.

Figure 2B:
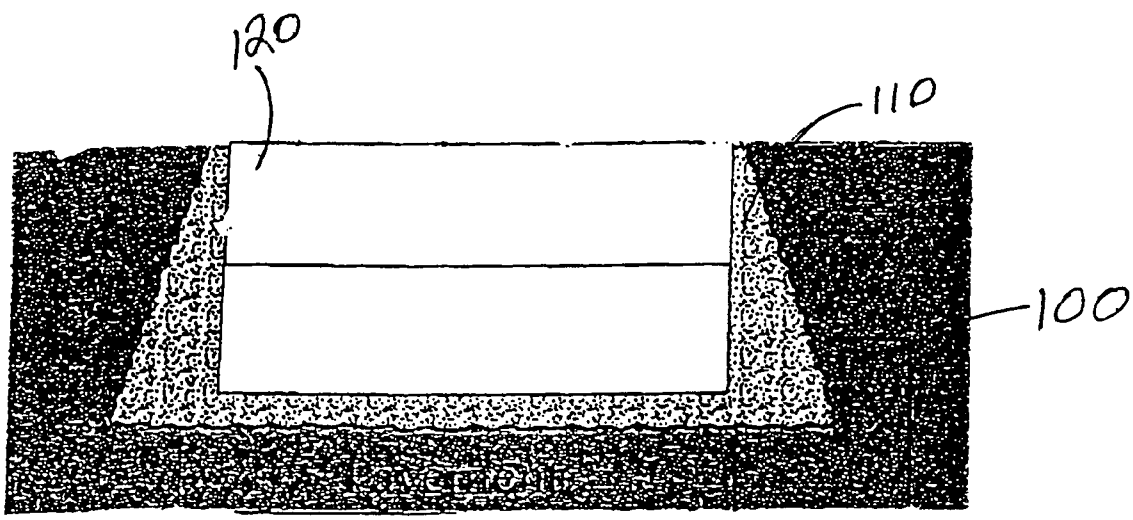

FIG. 2B shows a pothole repair according to the systems and methods and materials of the invention in which one or more pre-made composite material blocks or slabs or rods, etc. are used. Two pre-made composite forms 120 are illustrated in the exemplary embodiment of FIG. 2B, being used with melted composite mixture 110. According to the systems and methods according to this invention, the pre-made composite forms may be pre-heated to melt a thin surface layer so that the forms and hot, loose composite mixture is fused together upon application of heat and pressure. Melted composite mixture 110 may be added to the hole before placement of the pre-made composite forms to fill voids, including the illustrated beveled taper of the side walls of the hole. One way to completely fill the hole or void is to apply a compressive force/load to the top surface of a pre-made composite form until the melted composite mixture 110 solidifies. FIG. 2 also depicts a circular hole cut into pavement over the complete area of pothole damage. To offer good bonding and lockage, the side walls may be tapered so that the diameter of the bottom of the pothole is larger, such as, for example, by an inch or so, that the diameter of the top of the pothole. Additionally, a rough, wavy surface finish shown on the inside walls of the pothole may be provided.

A special composite mix formulation is used for expansion joints in highways and other pavements. The formulation has a high volume content of "CRUMB" rubber pieces, with sufficient polymer for adhesion to form a compressed but resilient solid structure. A structural/thermal analysis, which is shown below, indicates about 20% by volume polymer and 80% by volume "CRUMB" rubber pieces when mixed together and compressed into an expansion joint at 150 psi compression pressure will offer the several features. Lower polymer content will result in less shrinkage and faster cooling. The 150 psi compression stress on the resilient rubber produces an elastic strain which is locked into the rubber when the polymer solidifies around the rubber and this causes the rubber to spring back to offset the total composite mix solidification and cooling shrinkage plus pavement thermal contraction in cold weather, thus substantially reducing the likelihood of crack formation between the expansion joint and pavement.

FIGS. 5A–5G show exemplary embodiments of a reinforcing member used to strengthen repair of pavement, including potholes in pavement.

Figure 5A:
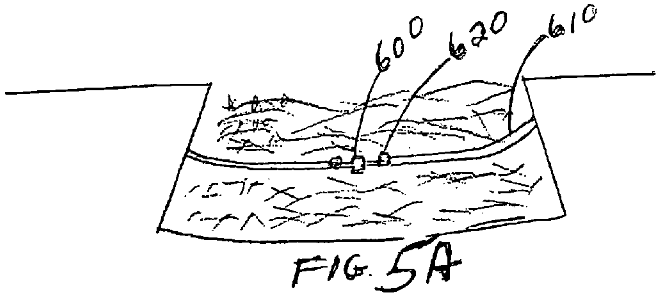
FIGS. 5A–5G are views of various exemplary embodiments of a structural reinforcement for use in potholes as shown in FIG. 5A according to this invention.
Figure 5B:
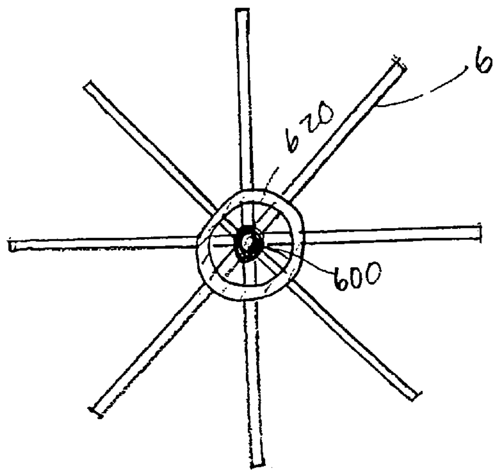
Figure 5C:
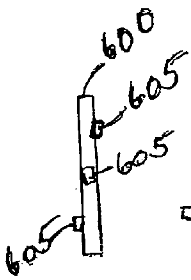
Figure 5D:
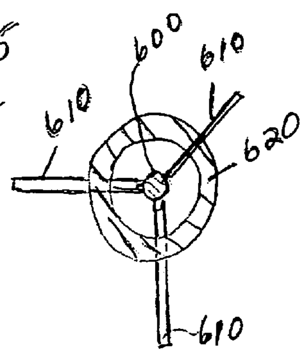
Figure 5E:
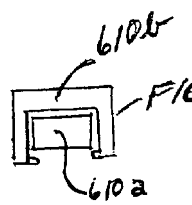
Figure 5F:
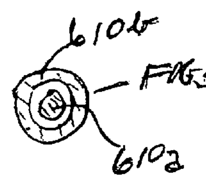
Figure 5G:
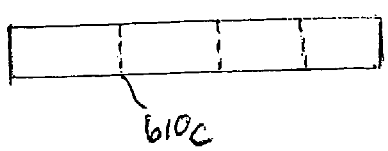
Figure 6A:
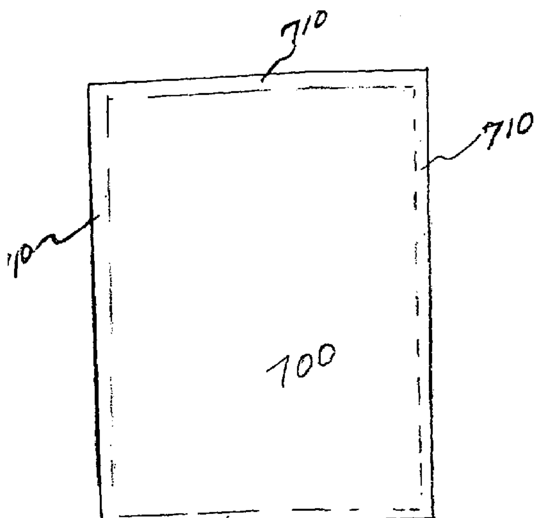
FIGS. 6A–6F are various views of structural panels made according to the systems and methods and materials of this invention.
Figure 6E:
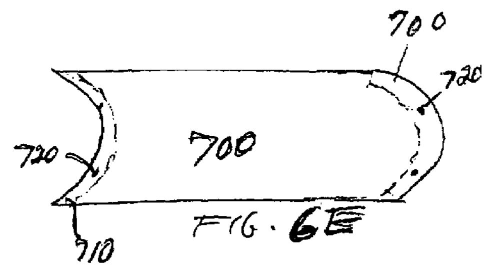
Figure 6B:
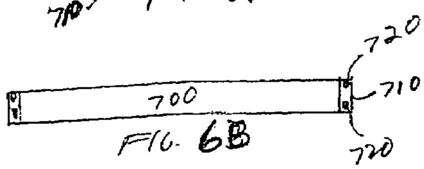
Figure 6C:
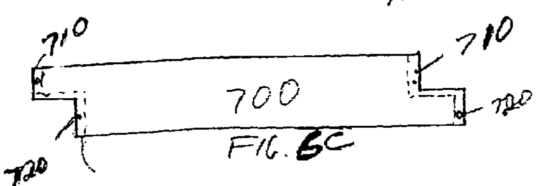
Figure 6D:
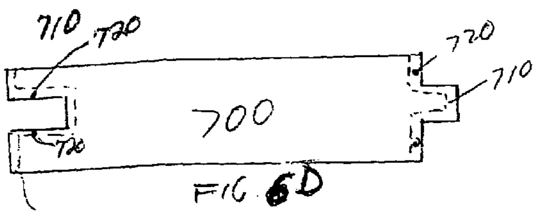
Figure 6F:
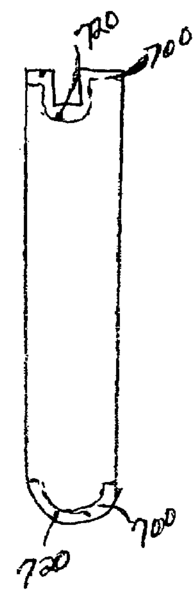

FIG. 5A shows a radial insert, a reinforcing insert which is placed in a pothole to provide strength and rigidity to the pothole patch. FIG. 5E shows a cross section of one of the radial arms of the radial reinforcing element. It shows a channel in which another element is movable so that the length of any individual radial arm can be changed. FIG. 5F shows a cylindrical sleeve in which a center radial element can project and move to withstand the length of a radial arm. FIG. 5C shows a length of one of the radial arms showing that it is segmented so that the radial arms may be easily sawed off or broken off before being placed into the pothole or even after they are in the pothole. FIG. 5D shows a core of the radial element with receptacles for the radial arms to be inserted in. FIG. 5B shows a top view of the radial elements. FIG. 5A shows that the radial arms are bent upwards as they go further away from the hub or core of the radial elements and that they bare firmly against the tapered edge of the pothole. This results when the arm diameter is larger than the internal pothole taper diameter, since the arms will bend upward as the radial arm assembly is pushed down into the pothole. In order to insert the mechanical locking hub spoke device which improves the strength and bonding of the composite mix repair batches and potholes, one may follow the following application steps: first, cut out irregular shaped potholes to a circular shape with tapered sidewall and clean out all debris. 2. Push in the spoke bendable hub spoke assembly to engage the tapered sidewall of the pothole. 3. Fill the pothole with the composite mix loose melt or mixture of loose melt and pre-made shapes. 4. Compress the composite mix at, for example, 20 psi until solidified. As shown in FIGS. 5C–5G, the assembly can provide adjustable lengths to the spokes.

The following exemplary embodiment of the systems and methods and materials of this invention can be employed. First, a fine particle "powder-like" formulation (for example 80% polymers, 20% rubber dust sized particles) is wiped or sprayed or otherwise coated on the surfaces around the edges of potholes in order to completely seal all holes, cracks and fissures in the edges and adjacent surfaces prior to filling the entire pothole with composite mix and/or to promote adhesion of the composite mix to the pothole. This fine mix may also be used alone to fill narrow cracks in road lane seams. This fine mix may also be used as an additive layer applied over composite mixtures to improve surface sealing of the composite mixture and improve surface smoothness. Also because road lanes seams are continuous, large amounts of material may be required. This particular material also takes into consideration road bed thermal expansion. Second, fill in the larger holes with a coarse heated mix formulation that adheres well to the fine mix and tamp and vibrate at 10–30 psi compressive load until composite mix solidification to displace all voids and to make a level surface. Third, wipe or spray on another overlay of fine particle "powder-like" formulation over the top surface of the filled hole to provide a desired pavement color match plus improved surface friction and overlap or feather it manually onto the adjacent roadway surface. Fourth, apply any necessary heating or other procedure for curing the overlay.

FIG. 6 shows a structural element, such as, for example, a structural panel made of the composite materials of this invention and which has metallic electrical tape inserted in the edges so that upon application of electricity to heat this tape the edges of the panel may be melted and may be merged with and bonded to another paneled section.

FIGS. 6B–E show various cross-sections of panels with tape in the edges to facilitate joining of separate panels according to this invention. The panels or sheets of composite mixture material also can be die cut to stamp out various shaped objects. To improve the structural characteristics of these panels, a melted panel shape may be die cut with the full panel under a compressive force of 100 psi minimum until full solidification and any excess material is retained for re-use in making other panels or other structural shapes.

The following engineering analysis and calculation for compressive load requirements when compressing the composite mix formulation into pavement expansion joints is presented only as a theoretical basis explaining why the invention works as it does, and is not intended to be limiting in any manner. It is presented only as an aid to understating the theoretical basis for explaining the invention. The invention, including the composite mix and its properties transcend any theoretical basis, such as the one presented here, which may explain why the composite mix possesses certain properties. The following engineering analysis and calculation for compressive load requirements when compressing the composite formulation into pavement voids, including expansion joints is accomplished with reference to FIG. 4A and the following equations:

$$\Delta W_R=[C_{pth}+C_{cmth}+S_{cmf}]M_1 \tag{1}$$

where $\Delta W_R$ is the thermal contraction of the pavement+thermal contraction of composite fill in the pavement expansion joint+shrinkage of composite fill; The summation of these three quantities is then multiplied by a safety factor multiplier ($M_1$).

$C_{PTh}$ is the thermal contraction of the pavement, which is also expressed as $\alpha_C L\ \Delta T$;

$C_{CMTh}$ is the thermal contraction of the composite mix, also expressed as $\alpha_M W\ \Delta T$; and $S_{CMF}$ is the shrinkage of the composite material fill in the expansion joint, also expressed as $F_S$ W.

Where W is the width of an expansion joint to be filled by composite material.

$$F_S=0.0211(F_p/0.5) \tag{2}$$

This expression is based upon a test giving $F_s$=0.0211 at $F_p$=0.5 where $F_S$ is the shrinkage fraction of the composite material fill; and $F_P$ is the shrinkage fraction of the polymer.

$$(\Delta W_R)/WF_R=[\alpha_c L\Delta T+\alpha_M W\Delta T+F_S W]M_1/WF_R \tag{3}$$

where $F_R$ is the rubber fraction of the composite material fill in the expansion joint; and W is the width of the pavement expansion joint filled by composite material.

$$\mu_R=[\Delta W_R/WF_R][dF_R/\Delta d_R] \tag{4}$$

where $\mu_R$ is the poison ratio of rubber in the composite material in the expansion joint.

d is the depth of the composite material in the expansion joint;

$F_R$ is the fraction of rubber in the composite material; and $\Delta d_R$ is the change in depth dimension of the rubber fraction in the expansion joint composite material upon compression.

From (4) $[\Delta W_R/(WF_R)](1/\mu_R)=\Delta d_R/dF_R$ $$S/E_R=\Delta d_R/dF_R \tag{6}$$

where S is the stress applied to the composite mix expansion joint material in the expansion joint; and $E_R$ is the modulus of elasticity of rubber.

$$\Delta d_R=SdF_R/E_R \tag{7}$$

where S is the stress applied to the composite mix expansion joint material in the expansion joint;

Using equations (7), (5) and (3), it is shown:

$$S=E_R[\alpha_c L\Delta T+\alpha_M W\Delta T+F_S W]M_1/WF_R\mu_R \tag{8}$$

where again stated: $E_R$ is the modulus of elasticity of rubber;

$\alpha_C$ L ΔT is the thermal contraction of the pavement;

$\alpha_M$ W ΔT is the thermal contraction of the composite mix, $F_S$ W is the shrinkage of the composite material fill in the expansion joint;

$M_1$ is the Safety Factor Multiplier;

$F_R$ is the rubber fraction of the composite material fill in the expansion joint;

W is the width of the pavement expansion joint filled by composite material; and $\mu_R$ is the poison ratio of the rubber material in the expansion joint.

$$P=SWl \tag{9}$$

where P is the load expressed in pounds;

W is the width of the pavement expansion joint filled by composite material; and l is the length of the compression tool used on the expansion joint composite material.

$$\Delta W_R=(W/d)\mu_R\Delta d_R \tag{10}$$

where W is the width of the pavement expansion joint filled by composite material;

$\mu_R$ is the poison ratio of rubber in the composite material in the expansion joint;

d is the depth of the composite material in the expansion joint; and $\Delta d_R$ is the change in depth dimension of the rubber fraction in the expansion joint composite material upon compression.

$$\Delta V_R/V_R = 1-(dF_R-\Delta d_R)(WF_R-\Delta W_R)l/(dF_R)(WF_R)l \tag{11}$$

$$= 1-\left[\frac{[(dF_R)-(S/E_R)dF_R][WF_R-(W/d)\mu_R(S/E_R)dF_R]l}{(dF_R)(WF_R)l}\right] \tag{12}$$

$$= 1-[1-(S/E_R)][1-\mu_R(S/E_R)]$$

Where: $V_R$=Volume of rubber in the composite mix.

$\Delta V_R$=change in rubber volume in mix when compressed.

The length l of the compression tool is, in this exemplary embodiment, 1.25 inches, which is 30 degrees of circumference on a 4" diameter roller. The expansion joint 110 is located between two closely separated pavement sections 100. The width W of the expansion joint is set at 4 inches. The depth d of the expansion joint is set at 4 inches. The length L of each pavement section separated by the expansion joint material 110 is set at 12 feet, i.e., 144 inches. The coefficient of thermal expansion of the concrete ($\alpha_C$) equals $5\times10^{-6}$ inch/inch ° F. The coefficient of thermal expansion of the composite mix ($\alpha_M$) equals $37.6\times10^{-6}$ inch/inch ° F. Poisson's Ratio ($\mu_R$) equals 0.50. The Rubber fraction of the volume of the mix $F_R$ equals 0.80 and the polymer fraction ($F_P$) is 0.20. The Shrinkage Fraction of the composite mix ($F_S$) equals 0.0211 (0.2/0.5). The modulus of elasticity of the rubber, ($E_R$), equals 2000 psi. A safety factor ($M_1$) of 1.2673 is used. The temperature difference, (ΔT) of both the composite mix and the payment from the time of installation to a winter cooling period temperature is 70° F. Using equation No. 8, S, which is the compressive stress needed to be applied to the composite mix during its installation is determined to be about 150 psi. Using equation No. 9, P, which is the force applied to the composite mix in the expansion joint during installation, is determined to be about 750 pounds. Using equation 6, $\Delta d_R/(dF_R)$ equals 0.075, i.e., 7.5 percent. $\Delta d_R$ is the change in the depth of the rubber portion of the expansion joint, and $dF_R$ is the effective depth of the non-compressed rubber fractional component of the composite mix. $\Delta d_R$ equals 0.24 inch as determined by equation 7. $\Delta V_R/V_R$ equals 0.1096875, i.e., 10.97 percent as determined by equation No. 11.

This analysis is also applicable to filling potholes as well as to filling expansion joints with a polymeric, including a composite polymeric material. In dealing with potholes, an actual diameter of a circular pothole, or an average diameter of an irregularly shaped pothole may be used in the determination of the compressive area for calculating the force needed for needed compressive pressure stress. In the previous analysis example, the relatively lower polymer content of $F_P$=0.20 results in less shrinkage when solidifying from liquid form in cooling down, but is still sufficient to "bind-up" the "CRUMB" rubber pieces. Second, this relatively low polymer content results in more rapid cooling. Third, the high rubber content of $F_R$=0.80 provides a high resiliency and when compressed into the expansion groove at 150 psi, it will be compressed enough to spring back to offset the total composite mix solidification and cooling shrinkage, plus pavement cold weather thermal contraction, plus composite mix cold weather thermal contraction, and still retain approximately a 26.7 percent compression allowance. Based on calculations with the above equations, this amount of pre-compression is about 0.24 inch, which is about 10.97 percent of the total rubber on a volume basis, assuming the expansion joint groove width equals the group depth and each is about 4 inches in length, thus effectively providing a 3.2 inch by 3.2 inch rubber expansion joint. As mentioned above, using either a 3.2 inch rubber width or depth basis, the linear pre-compression is about 7.5%. Since this amount of pre-compression is very small, a higher than 150 psi compression load may also be used, which will increase the allowable compression force. It is not recommended that the polymer content be lower than 20% by volume of the mixture.

Figure 3B:
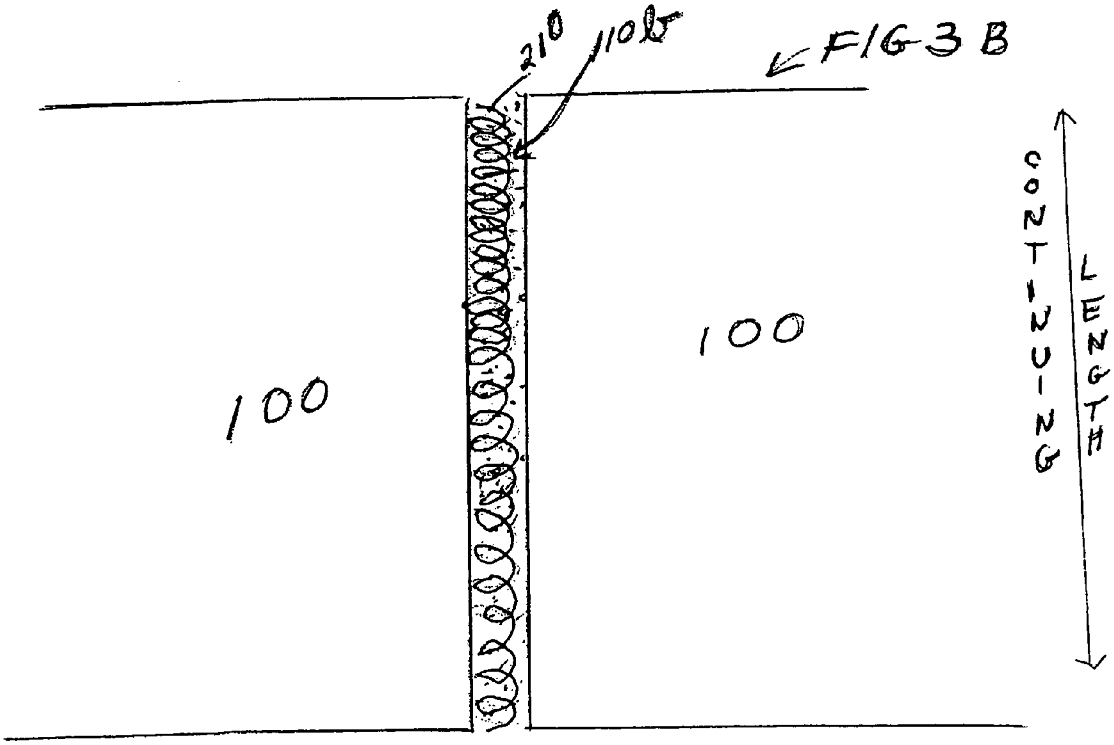
FIG. 3B is a top view of an expansion joint with an exemplary embodiment of a reinforcing member according to this invention.
Figure 3A:
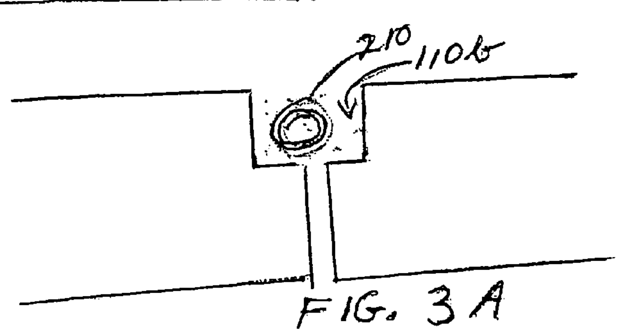
FIG. 3A is a side elevational view of an expansion joint with an exemplary embodiment of a reinforcing member according to this invention.
Figure 4A:
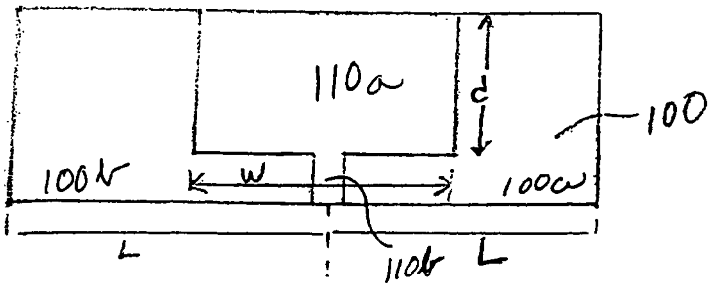
FIG. 4A is a diagrammatic side elevational view of an expansion joint showing parameters involved in an engineering analysis of systems and methods of filling an expansion joint according to this invention.
Figure 4B:
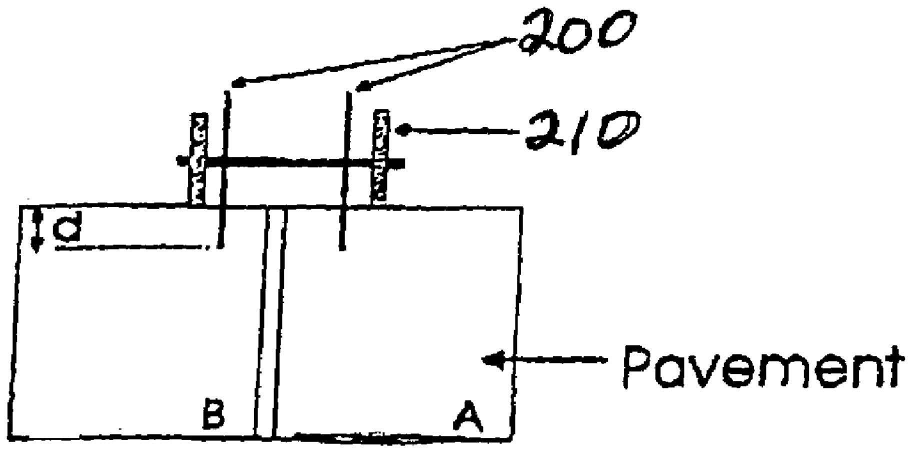
Figure 4C:
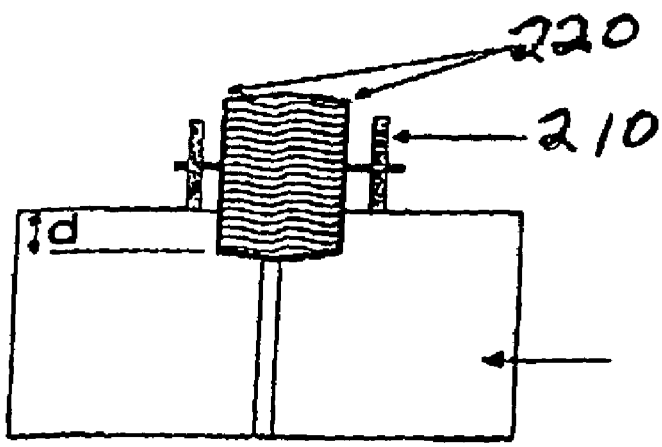

According to the systems and methods according to the invention, one exemplary embodiment used to prepare an expansion joint groove and applying the composite mix is shown in the attached FIGS. 4A–4C. FIGS. 3A and 3B show an expansion joint groove in pavement 100, located on the ground 90, with composite mix 110 and a reinforcing member 210. FIG. 4A shows an expansion joint in cross-section and illustrates various dimensions of the expansion joint. The method uses, for example, in step 1, shown in FIG. 4B. a double bladed circular saw, that is, a circular saw having two blades 200 mounted at a distance from each other on a common axle, is used to cut the sidewalls of an expansion groove. The saw blade radius typically is about 1.5 times the groove depth (d), and surface height guide wheels 210 moving along the pavement surface will control the groove cut depth. In step 2, shown in FIG. 4C, a router 220 is used to cut up pavement material between the saw blades to a depth (d). The width of the router may be about 1½ times the groove depth (d), and employ surface height guide wheels 210 same as with the saw. The diameter of the router may taper slightly upward from its edges to the center.

Figure 4D:
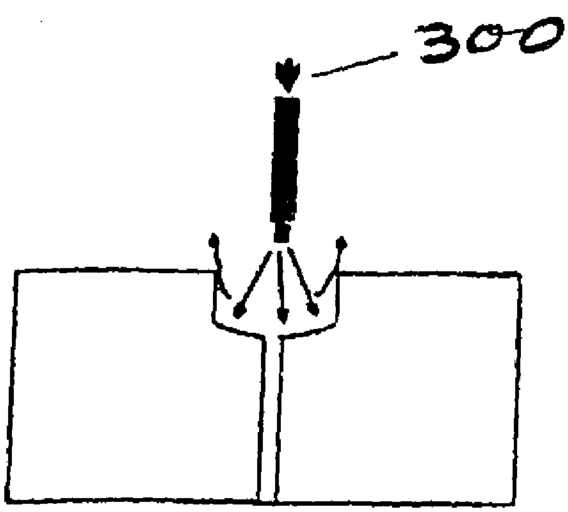

In step 3, shown in FIG. 4D, a high pressure air blast 300 is shown directed into the groove and along its edge at the pavement surface to blow out and away all cut up debris and dust.

Figures 4E, 4G, 4H, 4I, 4J, 4K:
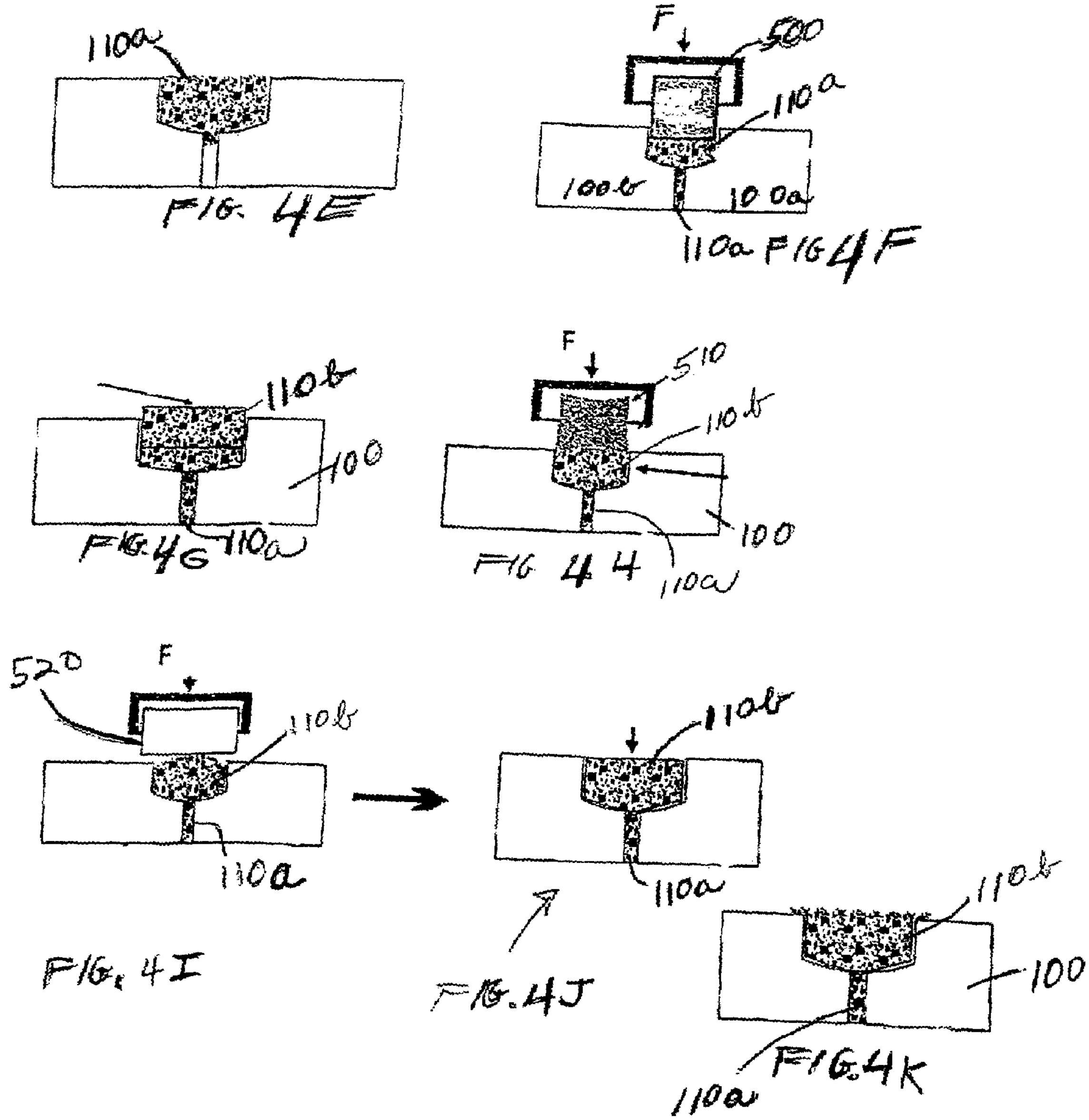

In step 4, shown in FIG. 4E, the melted/hot composite mixture 110*a* will be filled into the groove to full depth and slightly above the pavement surface.

In step 5, shown in FIG. 4F, a flat compression roller 500 of width slightly less than the groove width is shown rolling in the groove over the composite mix and will be force loaded to compress the mixture at a minimum compressive load of 150 psi.

In step 6, shown in FIG. 4G, more melted/hot composite mixture 110*b* is shown being filled into the groove on top of the previously compressed layer again to a depth slightly above the pavement surface.

In step 7, shown in FIG. 4H, a catenary shaped diameter roller 510 with edge flanges is shown rolling inside the groove over the composite mix and will be force loaded to compress the mixture to a minimum compressive load of 150 psi. The compressed shape will be higher at the center and slightly above the pavement surface with a slight void below the pavement surface at each edge. If necessary, to achieve this condition, a third application of mixed fill followed by this catenary edge flanged roller may be used.

In step 8, shown in FIG. 4I, a flat roller 520 wider than the groove is run over the previously compressed composite mix with a minimum compressive load of 150 psi. to flatten the center humps by pushing its material sideways into the edge voids so that the entire groove width will be level FIG. 4J with the pavement surface. Also if the level ends up slightly above the pavement, FIG. 4K that will be acceptable. If any portion ends up below the pavement surface, additional melted/hot composite mixture will be applied and compressively loaded with a flat roller by a follow on unit. This step must continue until the composite mixture has completely solidified. However, since the composite mix cools very slowly inside a pothole, or expansion joint, a compressive time period which is too long for a practical production purpose occurs. Accordingly, a subsequent 150 psi compressive rolling step, using a flat roller, 520 will be applied after the material bulk has cooled down to between 300 and 350° F. The length of this cooling time delay period will vary, but in general it is expected to about 30 minutes for potholes and about 5 minutes for expansion joints.

With respect to both filling potholes and making expansion joints, preliminary tests and observations have shown that adhesive binding is greatly improved if the surfaces of the various components have a slightly roughened and slightly porous like texture. Accordingly, a sand blasting operation may be used in conjunction with the mixing process to provide the slightly roughened and slightly porous like texture to the material. The sand blast propellant abrasive material would remain as part of the mix formulation. Moreover, to assist in locking the composite mix into the expansion groove, a continuous steel spring may be placed and anchored into the groove prior to adding the composite mix.

For various applications of the materials of this invention, including long continuous expansion joints, another exemplary embodiment of the systems, methods and materials according to the invention use an equipment train consisting of a double circular saw and router to form a shaped groove, followed by brushes and an air blast to clean the groove, followed by a melted mix feeder to fill the groove with the mix, followed by a combination compression loader and cooling bar. The travel speed and load/cooling length will be based upon providing the time required to cool the mix, to about 350° F., while under compressive load. If this speed is too slow for practical production, a follow-on compressive roller operation will be applied at a later time as mentioned, above, in paragraph [0063].

The described material, system and process embodiments of this invention can be used to make new pavements, to effectively repair damaged pavements and/or serve as sealant fillers for pavement expansion joints, and can form a number of useful structural products. These applications and products are cost effective and more economical with respect to existing repair processes and materials. These materials and processes will aid in solving certain environmental cleanup and waste disposal problems by using all types of recyclable materials including glass, rubber, roof/siding shingles, polymer/plastic, metals, coal combustion by-product, and small stones and sand. The small stones and sand may be acquired by grinding up concrete debris from highway demolition, for example.

This invention will be usable for all sizes, shapes, depths and irregularities of cracks and potholes and pavement, and even for larger areas that require full replacement of individual pavement sections or entire pavements. The methods and composition of this invention will provide a watertight seal for the repairs that are done. The compressive strength of repairs will vary but experiments indicate that the compressive strength of a solid casting of composite material should be at a minimum of about 1500 psi, which is ample for both all new and repaired pavements and the hardness of the material will resist severe abrasion. Although being hard and having a high compressive strength, the material will still be flexible, will accommodate pavement thermal expansion and contraction and highway vibratory and impact loads from heavy and heaving moving vehicles. The material and the patches and expansion joints will also tolerate up and down pavement shifting.

The composite materials according to this invention will resist chemical attack from gasoline, oil, diesel fuel, grease, de-icing chemicals and many other solvents, acids and alkalis. As mentioned above, the surface texture and roughness of the material especially in the application noted above can be tailored by adjusting the mixture constituent composition, such as adding more sand for a rough texture. The composite materials also tolerate non-crushable roadway debris and pavement joints are made so that it will not admit this debris. The composite materials according to this invention are about 50% lighter than concrete and have a tensile modulus and tensile strength several times greater than concrete. This greatly improves the strength to weight ratio and makes it extremely attractive for the aforementioned applications and also for other application. Further, these composite mixtures are moisture impervious and have good thermal insulation capacities. Moreover, the composite mixture material properties, such as density, tensile strength, compressive strength, flexibility, and hardness may be adjusted by variations to the mixture component composition and by the compressive force applied during cooling and solidification of the mixture. Moreover, as mentioned, infra, the inducing of a strain into the material in any of its embodiments as it is formed, provides healing qualities that are extremely beneficial.

One additional characteristic of the composite materials according to this invention is a "memory effect" such that if it is dented, for example, by a sharp object including a bullet, it will tend to retain and resume its original shape and surface finish contour following a time period from when it was dented.

Figure 7A:
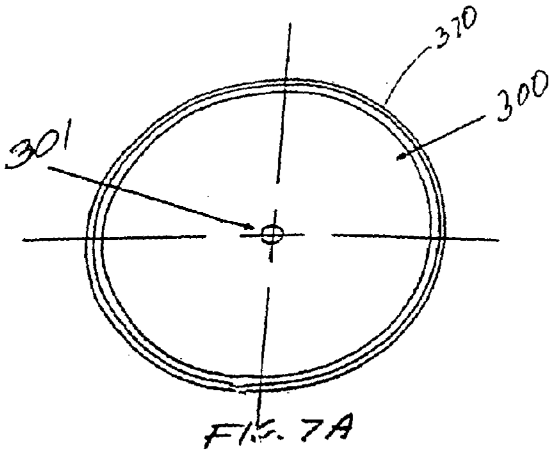
FIG. 7A is a top view of a first exemplary embodiment of a manhole cover extension using the composite materials of this invention.
Figure 7C:
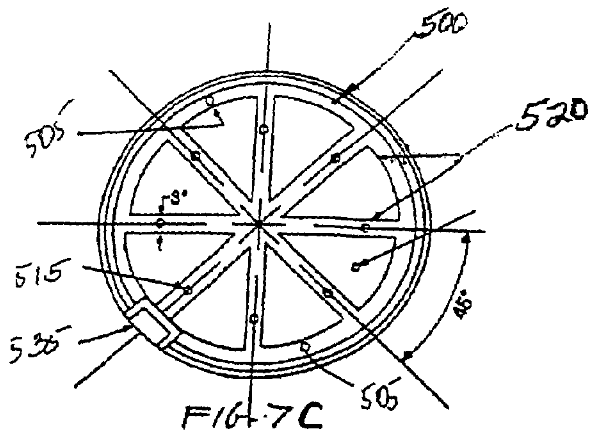
FIG. 7C is a top view of a second exemplary embodiment of a manhole cover extension using the composite materials of this invention.
Figure 7B:
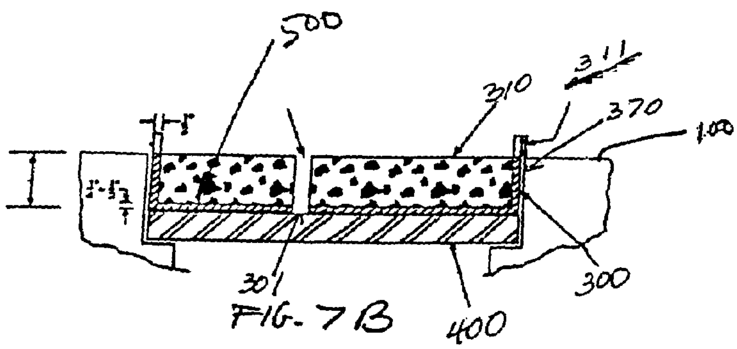
FIG. 7B is a side view of a first exemplary embodiment of a manhole cover extension using the composite materials of this invention.

FIGS. 7A–7D show manhole extensions using the composite materials of this invention. FIGS. 7A and 7B show a first exemplary embodiment of a manhole extension fixture according to this invention. Fixture 300 is shown located on a manhole cover 400. Fixture 300 is pre-made of any suitable material including composite mixture to act as a mold for a heated composite mix fill and withstand the forces normally acting on manhole covers. Such other than composite mix materials include, but are not limited to, malleable iron or iron alloys. In FIGS. 7A and 7B fixture 300 has a pan shape with an annular rim 310 having a nominal thickness, for purposes of illustration, of ½ inch. A hole 301 is located in the bottom of the pan to provide a means by which the fixture 300 may be fastened, e.g., by bolts and nuts, to a manhole cover 400. FIGS. 7A and 7B show the fastening hole 301 located in the center of the pan, but the location and size and number of fastening holes 301 may vary.

Figure 7D:
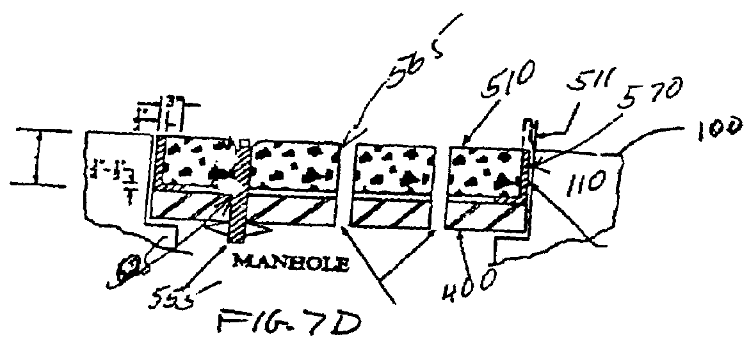
FIG. 7D is a side view of the second exemplary embodiment of a manhole cover extension using the composite materials of this invention.

FIGS. 7C and 7D show a second exemplary embodiment of a manhole extension according to this invention. Fixture 500 is shown located on a manhole cover 400. Fixture 500 is pre-made of any suitable material, including composite mixture to act as a mold for heated composite fill material and withstand the forces normally acting on manhole covers. Such materials, other than composite mixture includes, but are not limited to, malleable iron or iron alloys. In FIGS. 7C and 7D, fixture 500 has a pan shape with an annular rim 510. However, fixture 500 has an open bottom pan structure, the only portions of the base of pan 500 being spokes 520. the remaining portions of the base of pan 500 being open. FIGS. 7C and 7D show two alignment holes 505 located in the portion of the annular rim which forms part of the base of fixture 500. Any number of alignment holes 505 may be made in the fixture, through which fasteners (not shown) are placed to fasten the fixture 500 to the manhole cover 400. Holes 515 are located in the spokes 520. Any one of these spoke holes 515 may be used for fastening purposes. In this second exemplary embodiment, when heated the composite mixture is placed into the fixture, the manhole cover serves as a large part of the base of the mold into which the mixture is placed. Prior to filling the fixture with heated composite mixture, the holes in the manhole cover may be plugged with removable plugs. Then, after the mixture has been compressed and has set, the plugs may be removed and the holes drilled out through the set composite mixture. The holes do not absolutely need to be plugged, however, due to the small amount of mix that will normally be lost through these manhole cover holes.

The fixture may be supplied in kit form, along with bolts and mix and compression tools.

To fill a manhole cover recess using the device of FIGS. 7A and 7B, one pre-makes the pan fixture 300 to fit a manhole cover 400. Then, the pan fixture 300 is placed on the manhole cover. A hole is located in the pan fixture at the manhole lift out access hole to accommodate a lift-out tool for the manhole cover. If needed, another hole for a fastener, e.g., a toggle bolt, can be provided to fasten the pan fixture to the manhole cover. The manhole cover with pan attachment is then placed on the manhole, and any excess annular pan rim 310 portion 311 which extends above the pavement into which the manhole is placed is trimmed off, e.g., with a grinder to the pavement surface.

Then the pan is filled with hot, loose composite mix, heated to about 500 degrees ° F., for example, and is compressed to about 100 pounds per square inch (psi) until it is solid. This fill plus compaction process is repeated, as needed, until the surface of composite material is level with the pavement 100. Then, if needed, the pan is removed from the pavement recess and any composite mix that has been squeezed out beyond the side of the pan is trimmed away. Next, the fixture filled with composite mixture is placed in the manhole cover recess. As noted above, the fixture filled with the composite mixture may be fastened to the manhole cover using any suitable fastener.

To fill a manhole cover recess using the device of FIGS. 7C and 7D, one pre-makes the angular-hoop-spoke fixture

500 to fit a manhole cover 400. Then, the angular-hoop-spoke fixture 500 is placed on the manhole cover. A recess 535 is located in the fixture to accommodate a lift-out tool for the manhole cover. The angular-hoop-spoke fixture 500 is attached to the manhole cover using one or more alignment holes 515 and any suitable fasteners, 555 such as, for example, toggle bolts. Next, the manhole cover with fixture attachment is trimmed, i.e., the part of fixture rim 510 portions 511 which extends above the pavement into which the manhole is placed is trimmed off, e.g., with a grinder to the pavement surface.

Then the pan is filled with hot, loose composite mix, heated to about 500 degrees F.°, for example, and is compressed to about 100 pounds per square inch (psi) until it is solid. This compaction process is repeated, as needed, until the surface of composite material is level with the pavement 100. Next, fasteners 525 are installed in holes 515 located in the pan spokes 520, which may align with existing manhole cover holes, or which may be drilled for this purpose. Additional holes 565 may be provided in the pan and composite mix to match holes in the manhole cover. Then, if needed, the pan is removed from the pavement recess and any composite mix, e.g., "squeeze-out" that has been squeezed out beyond the side of the pan is trimmed away. Next, the fixture filled with composite mixture is placed in the manhole cover recess. As noted above, the fixture filled with the composite mixture may be fastened to the manhole cover using any suitable fastener. Next, to provide holes in the manhole cover-filled fixture assembly, if needed, holes are drilled through the solidified composite mix to align with corresponding manhole cover holes. Also, if needed, additional holes can be drilled through the solid composite material and the manhole cover. Lastly, the manhole cover-filled fixture assembly is placed over the manhole.

Another exemplary embodiment of a manhole cover fixture may include an assortment of sizes of pre-made composite material covers in various diameters and thicknesses, which may be attached to a manhole cover by any suitable fastener, such as, for example, toggle bolts.

Figure 8A:
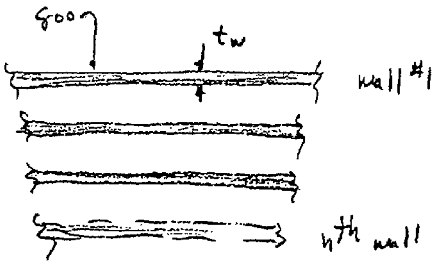
FIGS. 8A–8M are views of various protective wall embodiments using multiple thin wall panels according to the systems, methods, and materials of this invention.
Figure 8B:
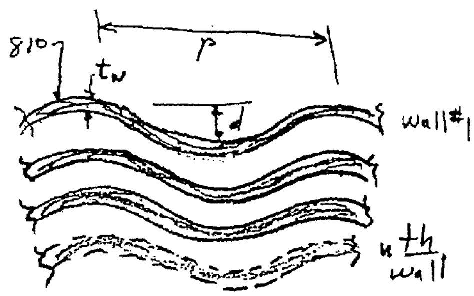
Figure 8C:
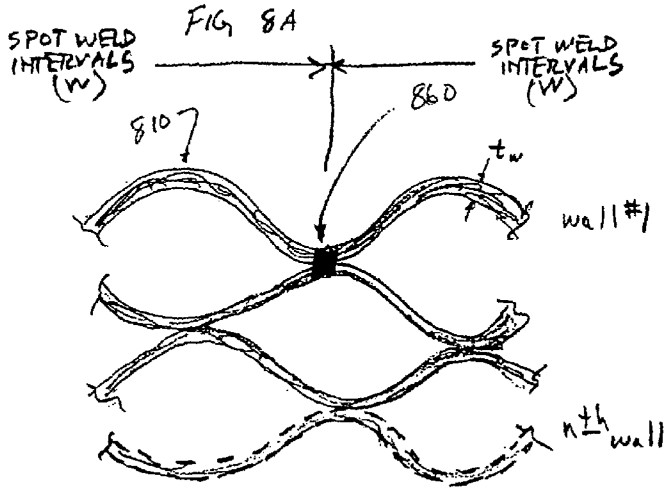
Figure 8F:
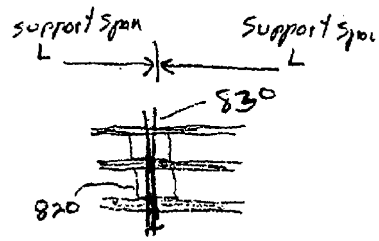
Figure 8D:
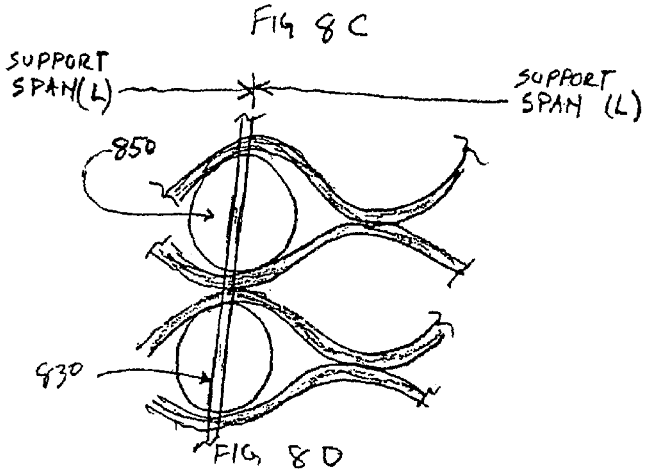
Figure 8E:
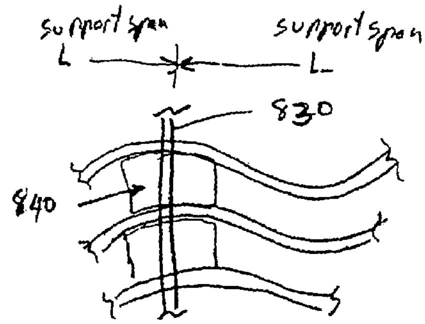

FIGS. 8A–8M show thin panel walls in series made from the disclosed composite mix to form a protective barrier to prevent serious physical damage to structures, buildings, large water dams, nuclear facilities, factories, defense structures, plane cargo bays, and any other structure that could be a potential target of attack by terrorists or others. Although a single panel 810 may be used as a protective barrier, typically, a number of panels 810 will be used in practice. FIG. 8A shows flat thickness ($t_w$) panels 800, FIG. 8B shows thickness ($t_w$) wave panels 810 of pitch (p), depth (d) spaced apart while FIG. 8C shows wave panels 810 touching. A spot weld 860 is shown, which is accomplished, for example, either with a heat gun or with electrical resistance heaters (as discussed above, in paragraph [0053], and with respect to FIGS. 6A–6F for panels.) The heat source melts the polymers at the spot location and upon cool down and polymer re-solidification, the wave panels 810 are spot welded. The weld intervals (W) may be the same distance in both the horizontal and the vertical directions, or may differ. In one exemplary embodiment, the intervals are about 10 ft. in both directions and the rows are staggered In FIG. 8D, a support post arrangement, 850, with tie rods 830 is shown for FIG. 8C configuration located at each a panel length (L). FIG. 8F shows a like support post arrangement, 820, with tie rods 830 and FIG. 8E shows a support post arrangement 840 with tie rods 830 for wall configurations FIG. 8A and FIG. 8B respectively. The goal of these configurations is to provide a strong but flexing wall 800, 810 with large deflection distance before it breaks. The total absorption force of the wall 800, 810 comprises bending deflection force, wall inertial force, wall fracture force, and wall-to impact-object friction force. The shown configurations optimize these forces and minimize the number of wall panels (n) and each wall thickness ($t_w$). The size of wall panels 800, 810 may vary considerably. In some exemplary embodiments of the systems and methods according to this invention, panels may be made in 10 ft. High×20 ft. long sections but other sizes are possible. Accordingly, for wall panels of this size, the support posts 820, 840, 850 will be at 20 ft. intervals. However, in one exemplary embodiment, to achieve the desired wall flexibility, the support posts will only be anchor-supported at the base (and/or at the top) at the desired wall fixed support span length distance of for example 40 feet and the intermediate posts 820 (or 840 or 850), which may, for example, be placed at 20' intervals, can be fastened together by brackets 890 and will not be anchored and will move (slide, for example,) with the wall(s) deflection. Spot welds, which, for example, may be made at approximately 10' interval spacing, may be applied for the purpose of aiding wall installation and offering an improved wall appearance. The spot welds can be designed to break apart upon a heavy impact load against the wall for the purpose of increasing the wall flexibility and deflection distance and increase the wall inertial resistance force to the impact. The spot weld span separation of, for example, 10 feet will allow the panels to intermesh slightly into an arrangement similar to FIG. 8B, which will somewhat decrease the walls moment of inertia (I) and lower the bending resistance force loss but this will be more than offset by the increased deflection inertial force resistance of the walls to an impact.

Figure 8G:
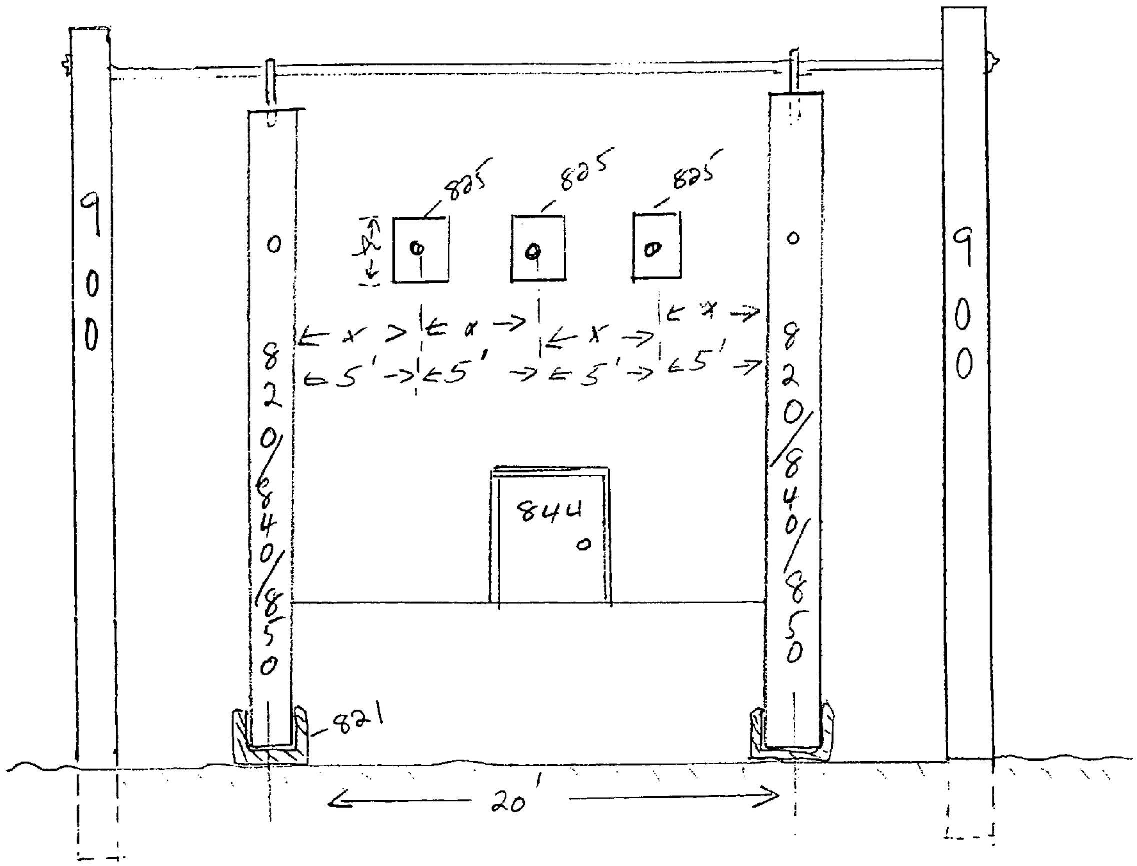
Figure 8H:
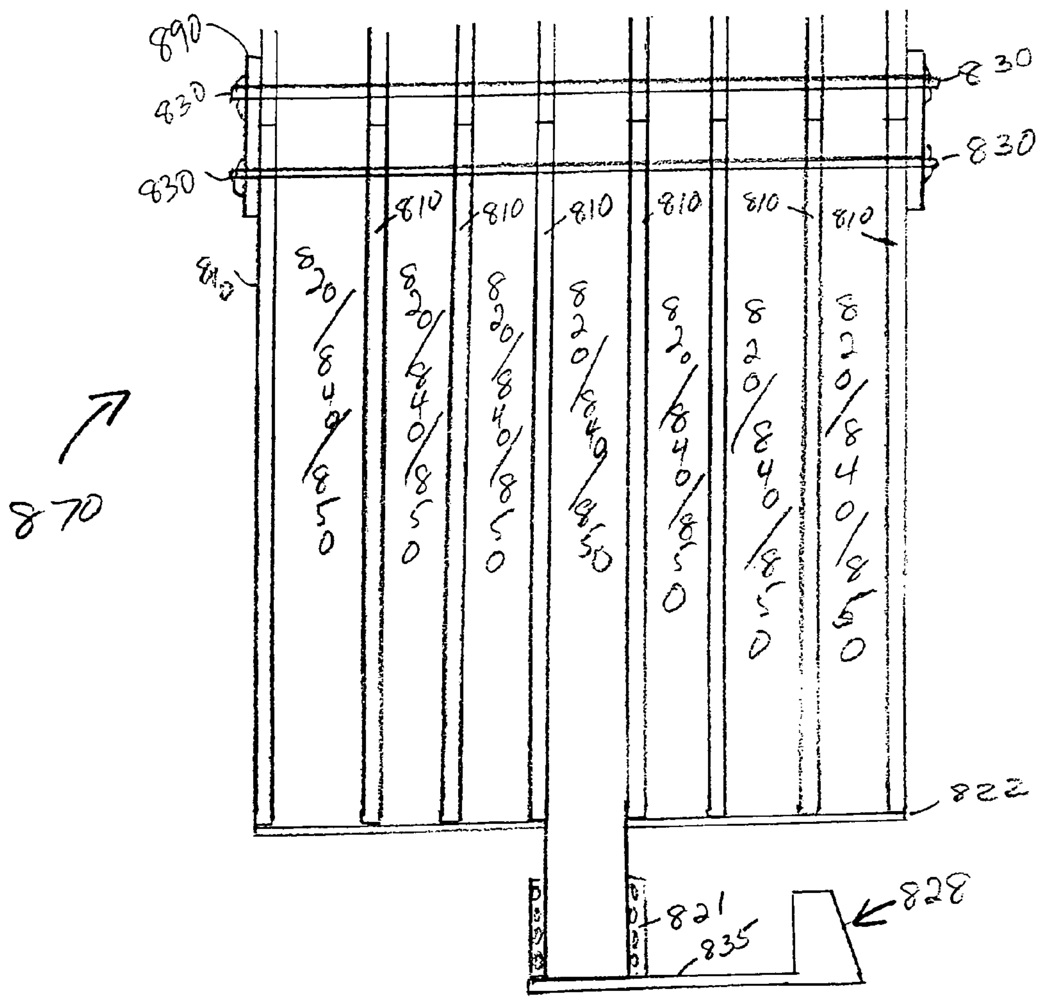
Figure 8I:
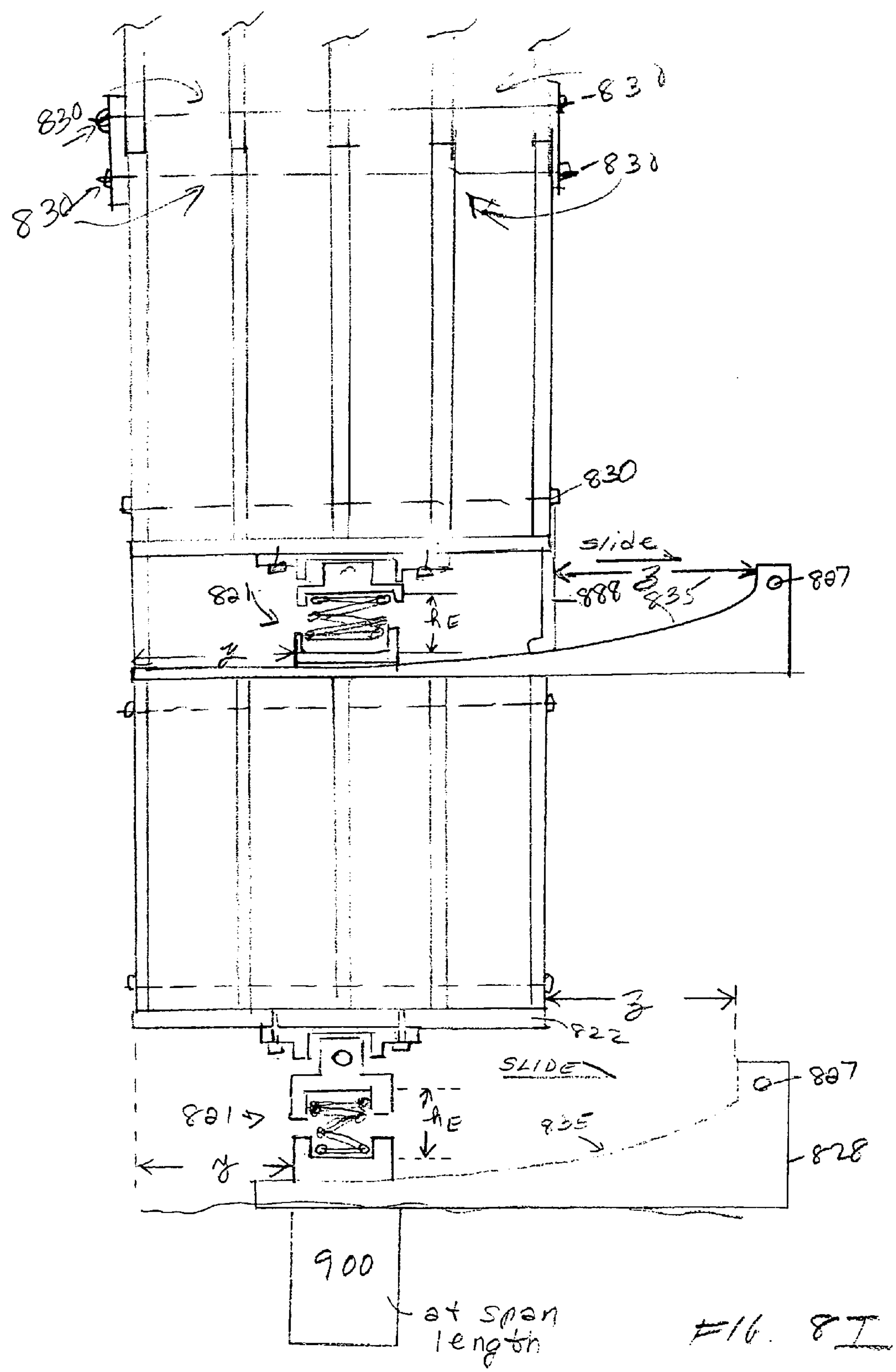
Figure 8J:
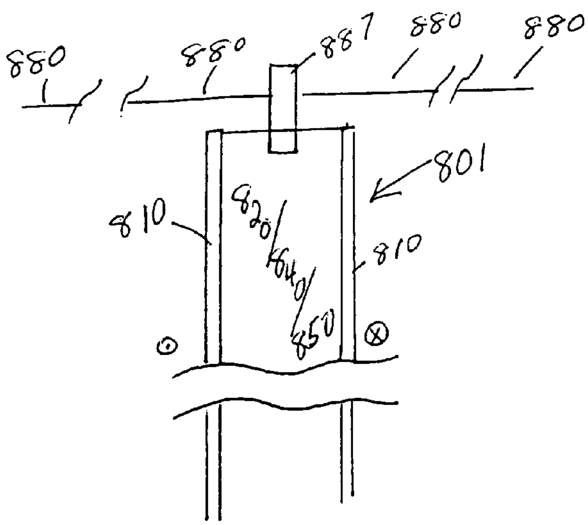
Figure 8K:
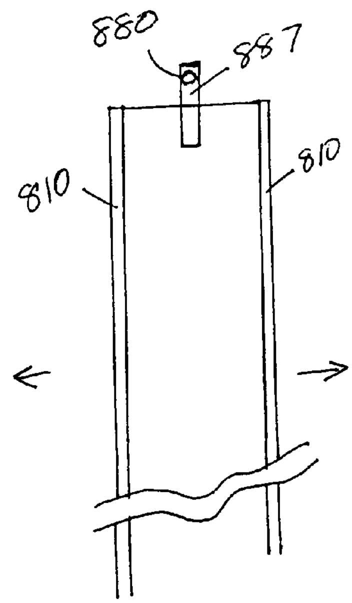

Another method used to increase the inertial force resistance of the wall employs a pivot-type panel support which may be attached to the top panel section in a panel group 870 of panel sections, as shown in FIGS. 8G, 8J and 8K. In these exemplary embodiments of the systems and methods of this invention, the top panel section of the panel group 870 may be supported by pivot supports 887, such as, for example, flexible hooks or pivot rings 887*a*, examples of which are shown in FIGS. 8N and 8O attached to an axial element 880, such as, for example, a cable stretched between fixed supports 900 that are structural columns per FIGS. 8G, 8I and 8M that are anchored to the earth (shown), or other fixed structures. Other hook shapes may also be employed, such as, for example, eyehooks. Each wall panel pair 801 per FIG. 8J, i.e., each pair of individual panels 810 connected together by one or more supports, such as, for example, support posts 820, 840, 850 and/or support spacers 825, may be provided with a flexible pivot support hanger 887 and support beam supports 880 as set forth in FIG. 8N. In FIG. 8N, a pivot support hanger 887 includes top and bottom hook portions 887*a*, hook flange portion 887*b* and an extension spring portion 887*c*. The hook flange portion 887*b* is bolted to the top of posts 820, 840, 850 and a modification can include a hook-bolt flange configuration pre-cast into the posts 820, 840, 850 when the posts are manufactured. The top and bottom ends of the spring portion 887*c* are welded to the portions 887*a*. The FIG. 8N embodiment of pivot support hangers 887 may be made from strong fibers such as for example aramid fiber which is both strong and flexible but more likely will be made from high strength steel or other high strength metals (e.g. titanium). Non-flexible pivot supports without the spring 887*c* could also be considered providing only one (1) support cable 880 is employed per wall as is most likely per the proceeding discussion however the flexible portion 887*c* offer another valuable degree of freedom; as for example, 887*c* becomes necessary if more than one support cable 880 were desired to reduce the size of 880 because of the need for a long span, high wall and possible desire for more than one (1) panel pair in wall depth. In practice, the number of pivot supports 880 and hangers 887 of suitable size and strength for each swinging panel groups is based upon the panel group weight and impact force and the amount (angular degree) of movement of the walls upon impact by a moving object.

Figure 8L:
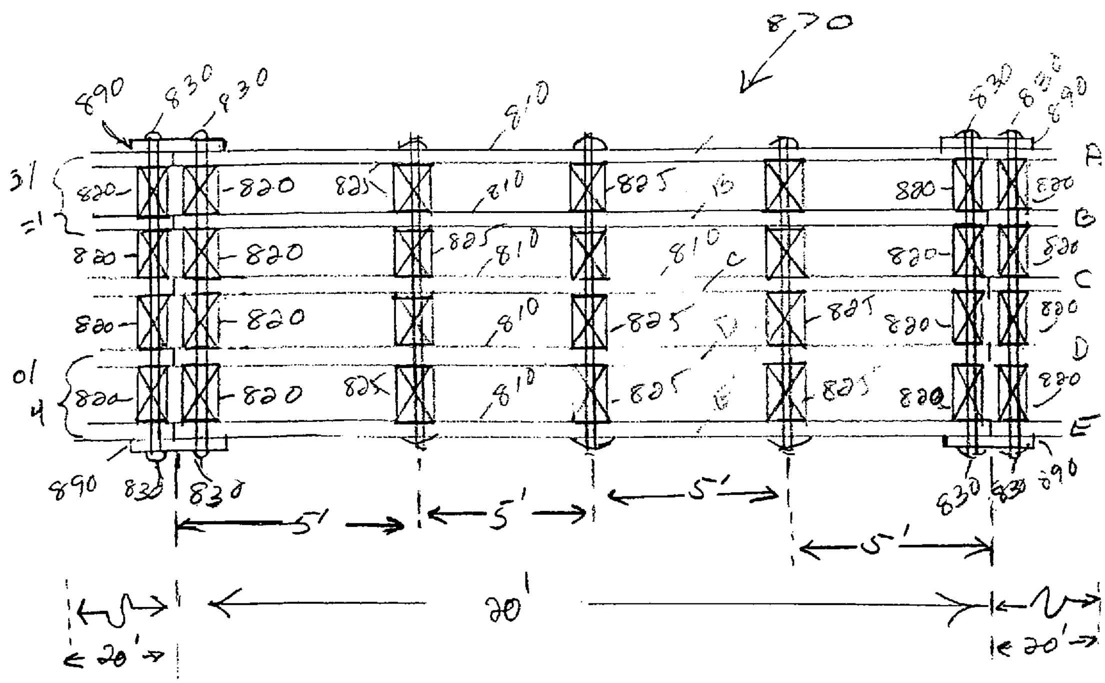

As shown in FIGS. 8G and 8L, the individual wall panels, in addition to being attached to posts 820 (or 840 or 850) at each end, also are attached to short pieces 825, for example, at both the top and bottom, which may have a height h of, for example, 6 inches and are spaced at a distance x, such as, for example, of five (5) foot intervals between the post supports 820, 840, 850) along a twenty (20) foot long panel section. At each end of a panel section, there are members 820, 840, 850 which span the full height of the section and the bottoms of which rest against a weight distribution plate-beam 822. In multiple panel-pair wall embodiments of the invention, tie-bolts 830 pass through both the short pieces 825 and the posts 820, 840, 850. Each wall section, which may be, for example, 10 feet high, may be fastened horizontally to the next 10 foot high wall section by a bracket 890, which may be bolted through to the posts 820, 840, 850 as shown, for example, in FIGS. 8H, 81 and 8L, and/or by a heat formed seal. If a wall panel section is also fastened vertically, it typically will not be fastened at pivot rod locations 880. A short height piece 888 of an extension of panels 800, 810 may be placed at the two outer faces of the wall to cover the free-gap space of the support cable and flexible support hangers 887 in order to provide a uniform and attractive appearance. Such an extension filler 888 is shown in FIG. 8I. Each panel group 870 of multiple panel sections, such as, for example, 10 foot high panel sections, has a flexible pivotal hanger support 887 at both ends and in between at a spacing interval x', as desired. A panel group is considered to be a plurality of panels connected in height and/or width on the outer panel faces by 890, whereas a panel assembly structure is considered to be a plurality of panel pairs connected in depth. FIG. 8L depicts a wall having five panel groups (A, B, C, D and E) each three panels wide and each having a width of 20 feet, and one panel assembly structure which is four panel pairs (A&B, B&C, C&D, and D&E) deep. Stops such as, for example, backstops 828 are provided to limit and restrain the movement of the walls after being impacted by an object. The stops 828 may comprise any suitable structure which limits and restrains the movement of the walls 800, 810, as they pivot-swing on a support 880, between the anchored columns 900, as shown in cross-section in FIG. 8I. The support 880 may, for example, comprise beams, rods or cables or other structural elements. A Stop 828, for example, is provided on top of the upper level panel section, as shown in FIG. 8I. In FIG. 8I, this is shown for example only on top of the ground level panel but it could also be located at higher panel levels. Stops 828 may be provided on the ground and atop single or multiple panel pairs 801, such as, for example, for walls above 20 feet high. The height of the support columns 900 or other fixed structures may, for example, be a multiple of the number of 10' high panel sections to complete the total wall height, such as, for example, 20' for a 20' high wall made up into a panel group 870 of two wall panel sections, each 10' high. While the axial support elements or supports 880 will often be used for a wall panel group 870 of more than one vertical or horizontal width panel pairs 801, such as, for example. two (2) panel sections, they can also be employed on wall panel assemblies with just one panel pair 801 or many panel pairs 801 and/or panel groups 870. Walls having plural panel pairs 801 may contain many panels (n) of large thickness ($t_w$) which are very heavy and require multiple support cable 880 and hangers 887.

FIG. 8H shows a panel assembly structure 870 made up of eight panel pairs 801 in depth and having a backstop 828 made of solid material such as, for example, composite mix, reinforced concrete or a steel post or bar. A backstop 828 may be provided, for example, at the center or more often along the width of each panel section assembly-group 870. Backstop dimensions and materials may vary depending on the impact load they are designed to receive. All of the posts 820 or 840 or 850, which support the walls 800, 810 are connected to a full panel section plan area support element 822, which may be a plate, that connects the bottom of panel pairs 801 all posts 820, 840 or 850. FIG. 8H also shows post extender support elements 821 also shown in detail in FIG. 8I, that extend due to gravity or other, e.g., spring force to support the wall panels as they move on impact of an object (or strong winds). The support posts 821 slide on a sloped upward bearing element 835 stops 828 when reacting to an applied force and until restrained by backstop 828. The mechanical and structural design of the support posts 821 including the post cross-sectional area, spring constant, etc. must be based upon the total wall weight load and the allowable tensile and compressive stress levels for the materials used in the post 821 and in the bearing element 835. In some cases, for example, thick, high and wide walls and more than one post 821 must be employed. The post location distance y must also be considered since this will contribute to the amount of extension height $h_E$ necessary for the post 821 for the amount of slope for surface 835. The length/distance/travel depth z of surface 835 is established by the desired amount of wall angular swing. The travel depth z of bearing surface 835, shown in FIG. 8I, is made long enough to accommodate the desired amount of wall swing distance. Provision of stops 828 allows the wall to swing enough to significantly increase the wall inertial force against an impact. Moreover, the strength of stops 828 can be designed to provide a failure strength equal to or greater than the bending strength of the walls alone over the span distance of support posts 820 (or 840 or 850) and the pivot support 880. FIG. 8I shows stop 828 including a connecting piece 827, such as, for example, a cable or rod which extends across the width of the panel section and into and/or through subsequent members 828 in a plurality of interconnected panel section assembly-groups 870. Another exemplary embodiment according to the systems and methods of this invention include a laterally displaceable wall, instead of, or in addition to, a pivoting wall, for the purpose of increasing the wall inertial force resistance to an impacting object is to employ a sliding wall. The laterally displaceable wall may be supported by post 821 against a surface 835, which may be a flat surface, for example, which is located at ground level. The sliding friction between the laterally displaceable wall and the surface 835 is made sufficient to prevent the wall from sliding for the highest expected wind velocity. This laterally displaceable sliding method for wall motion is, in general, easier to implement than a pivoting wall and, in general, provides a higher inertial wall resistance force since the entire wall weight is being moved and, in addition, the sliding frictional resistance is generally greater than the pivot friction resistance in a pivotable wall. Very thick, high, and long walls can be built without limitations such as the structural considerations involved with the support member

887 for a long span, high, and thick pivotable walls. Moreover, the support plate element 822 and post 821 can accommodate the compressive load for long, high, and thick walls. A further exemplary embodiment of the systems and methods of this invention is to eliminate the support post 821 and allow the bottom support plate element 822 to rest upon a flat surface 835. Another exemplary embodiment of the systems and methods of this invention is to provide rollers 836 for the wall to roll on, along surface 835, i.e., the wall would roll rather than slide. The rollers (not shown) may be provided between the wall and the surface 835 in a separate structure, and/or attached to, or form part of, the wall (e.g., to a support post, or to plate element 822) and/or attached to, or form part of, the surface 835. Additionally, the surface 835 may be covered with a water resistant cover, such as, for example, a plastic wrap, to reduce the likelihood of or prevent contamination by dirt and debris. Further, to prevent a sliding or rolling wall from tipping-over loose, extendible tie-lines can be attached to the top of the wall and then anchored to a support cable member such as 880.

FIG. 8J is a front view of a two panel wall having a single support post 820 (or 840 or 850) connected via connector 887 to suspending element, e.g., a cable or a rod 880. The wall 800 and support post 820 (or 840 or 850) is designed to move into or out of the plane of the paper on which the figure is drawn, when impacted by a force. FIG. 8K is a side view of a two panel wall having a single support post 820 (or 840 or 850) connected via pivot support 887 to suspending element 880, which may be, for example, a cable or rod. Movement of the support post when impacted by a force is from left to right and/or vice versa.

FIG. 8L shows a top view of a barrier having several walls of type 800 (n=5) making up composite wall. Although shown as flat walls n, each wall element 800*n* of composite wall 800 may have a different shape when viewed from the front, such as, triangular, or rectangular or octagonal, but each could have the same geometric shape when viewed from the top. Walls 800*n* (or walls 810*n*) may have other shapes than flat or wave, such as, for example, a circular shape when viewed from the top, so as to form cylinders when connected together. Factors that may affect wall shape include terrain on which the composite wall is built. Access doors 844, illustrated in FIG. 8G, may also be provided in different walls n and may be in-line or offset or in different wall segments of individual walls forming a composite wall assembly 833.

In one exemplary embodiment, a protective wall section may have 40 panels (where 40=n in FIGS. 8A–8C), each 10 feet high and 20 feet wide, and each approximately ⅛ of an inch to ¼ of an inch thick, fastened together, such as, for example, in FIGS. 8C–8F and made of the composite materials described above. Each individual wall panel n may be separated from each other wall in the composite wall by a distance (d) of, for example, about 5 inches. This, in an embodiment using corrugated shaped walls, such as those shown in FIGS. 8C and 8D, and the separation between each wall panel section which makes up the composite wall varies from 0 to 10 inches. Size of the posts 820, 840, 850 also may affect wall separation distance. The number of (n) of wall panels 800, 810 in a composite wall assembly 833 (where, for example, n=5 as shown in FIG. 8L) may vary from one to any reasonable number, depending on the strength and impact resistance desired for the composite wall assembly. Factors to consider in determining a composite wall assembly configuration include the distance of wall swing, the bending force of each wall, the breaking force of each wall, the friction force between an object which impacts and penetrates one or more wall panels, and the angle of deflection of each panel segment assembly-group 870 after impact of an object until the wall is stopped.

Figure 8M:
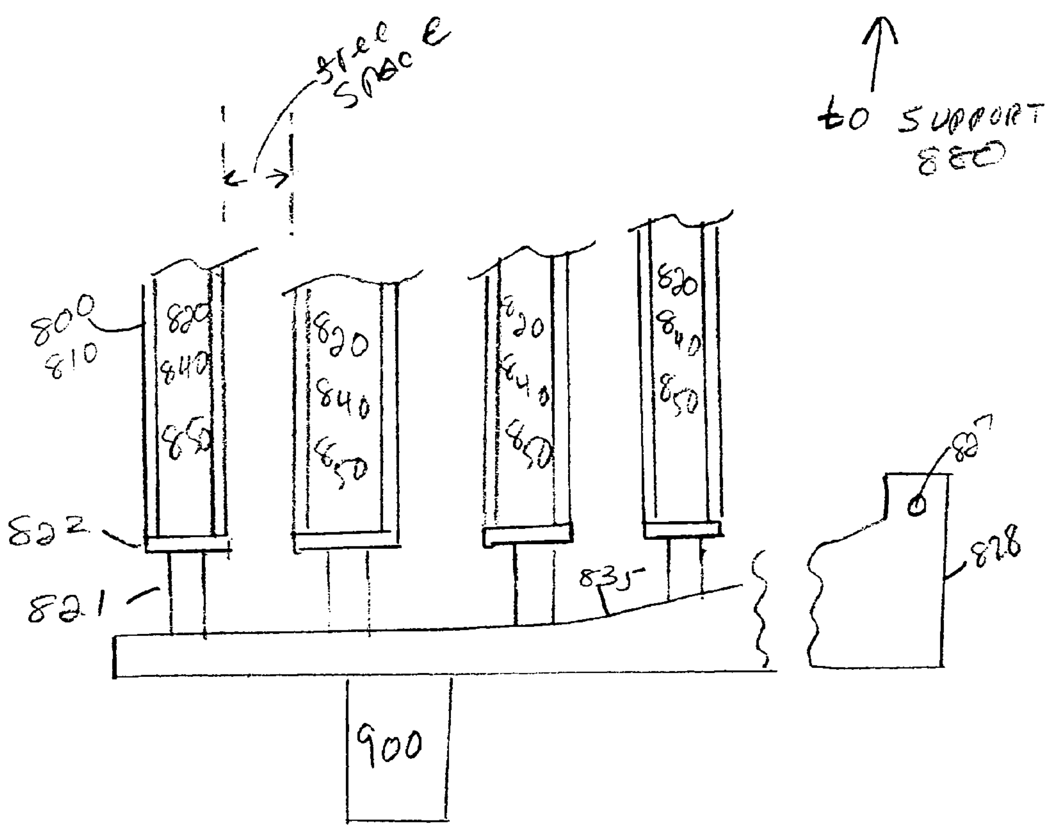

FIG. 8M illustrates an other exemplary embodiment of the systems and methods of this invention, that is, four individual wall pairs 801, each resting on a plate 822, separated from each other by free space. Each wall pair 801 may be connected to a single pivot support 887, and slide along an angled slide 835, as shown, or a pivot support need not be used, in which case the wall units may slide or roll along a slide 835 which need not be inclined.

The material composition and compressive load will be optimized for each type and for each specific application, such as, for example, walls, blocks, pot-hole fill, pavements, etc. To date, blocks with the following two optimized trial/test compositions and compressive loading prior to solidification of the composite material were made and tests were conducted on thin slices cut from these blocks. These samples were heated in air during manufacture, rather than in an inert gas, and, thus, the strength properties differ from samples which are heated in an inert gas in the sense that the samples heated in air are weaker than the samples heated in an inert gas.

| Material | Composition 1 Strength Tests Volume % | Composition II Flammability Tests Volume % |
|---|---|---|
| Polymer 1 (HDPE) | 12 | 10 |
| Polymer 2 (LDPE) | 12 | 10 |
| Polymer 3 (PS) | 12 | 10 |
| Polymer 4 (PP) | 12 | 10 |
| Polymer 5 (PVC) | 12 | 10 |
| Glass (dust to ¼" size) | 15 | 0 |
| Rubber (dust to ¼" size) | 25 | 45 |
| Coal combustion by-product | 0 | 0 |
| Roof/siding shingles | 0 | 0 |
| Gravel | 0 | 0 |
| Sand | 0 | 5 |
| Compressive Loading during Cool-down from 500° T to 350° F. | 22.8 psi | 6.94 psi |

Physical and/or chemical characteristics of Compositions I and II are:

| | |
|---|---|
| Damage due to cooling to −35° F. | None |
| Water Absorbtion on immersion | None |
| Damage to de-icing salt (CaCl; NaCl) | None |
| Dry coefficient of friction on rubber tire | 0.522 |

(Note: Correspondingly, the coefficient of friction of an old rubber tire on asphalt pavement is 0.571)

Shear strength: Between 577 psi and 459 psi by drop test

Flammability: very low, quickly self-extinguishes, difficult to ignite

Density: 60 lb/ft$^3$ to 100 lb/ft$^3$ depending on composition.

Healing properties: Material form heals itself from bullet holes and scratches/dents.

Projectile stopping properties: 1" thickness stops high velocity 0.22 caliber bullet (½" to ¾" penetration).

Shockwave results: Damps-out impact shock wave of high velocity 0.22 caliber bullet with no back-spalling.

Compressive strength: ASTM D698: 867.4 psi average (½"×½"×2" samples); 1258 psi (2.78"×1⁄395"×3.02" sample); 2829 psi (6" diameter×1.06" thick sample).

Tensile modulus: ASTM D638: 185,437 psi Avg. (1" wide×¼" thick samples).

Tensile strength: ASTM D638: 319.4 psi Avg. (1" wide×¼" thick samples).

Flexural strength: ASTM D790: 722 psi Avg. (½"×7/16"×4" span samples).

Flexural modulus: ASTM D790: 45057.6 psi Avg. (½"×7/16"×4" span samples).

Izod Impact: ASTM D256: 0.557 ft-lb. Avg (½"×7/16"×4" samples).

Compressive force values needed to impart the aforementioned elastic strain that is built into the composite material (1) overcomes and/or compensates for polymer shrinkage in a molding process application of the composite material; (2) maintains tight contact of the composite material with pavement, or other materials and/or material surfaces when used as an expansion joint material if the other surfaces shift apart and/or thermally change dimension due to, for example, temperature changes; (3) promotes self healing of the composite material after the material is physically penetrated, such as, for example, scored, scratched, or gouged; and (4) increases impact strength tolerance of the composite material are set forth as follows:

| Item | Compressive Force |
|---|---|
| Potholes, pavements | 10–30 psi |
| Expansion joints | 150 psi minimum |
| Wall panels | 100–500 psi |
| Bricks/Blocks | 5–25 psi |
| Posts, beams | 100–500 psi |
| Manhole cover recesses | 100 psi |

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within the scope encompassed and equivalents thereof with respect to the features set out in the appended claims.

What is claimed is:

1. A cured compressed composite mixture material product having a built in elastic strain that provides one or more enhanced composite material physical properties, comprising the following recycled materials:

from about 40% to 60% by volume of polymers; from about 25% to 50% by volume of rubber;

from about 10% to 20% by volume of glass; from about 5% to 15% by volume of sand and/or recycled shingles; and from about 10% to 15% by volume of small gravel and/or coal combustion by-product, the total volume percentage of all components in the mixture being 100%; and said product has a structure which retains a built-in elastic strain that exhibits one or more enhanced physical properties.

2. The composite mixture material product of claim 1, wherein the material portions comprise:

about 45% by volume of polymers;

about 25% by volume of rubber;

about 15% by volume of glass;

about 5% by volume of sand and/or recycled shingles; and about 10% by volume of small gravel and/or coal combustion by-product.

3. A cured compressed composite mixture material product having a built-in elastic strain that provides one or more enhanced composite material physical properties, comprising the following recycled materials:

from about 25% to 50% by volume of rubber;

from about 10% to 20% by volume of glass;

from about 5% to 15% by volume of sand;

from about 5% to 15% by volume of small stones and/or gravel and/or coal combustion by-product;

from about 2 to 5% by volume of metal of at least one type; and from about 5% to 10% by volume fiberglass or asphalt shingles;

the total volume percentage of all components being 100%; and said product has a structure which retains a built-in elastic strain that exhibits one or more enhanced physical properties.

4. The composite material product of claim 3, wherein the metal is in the form of small particles of recycled or virgin metal.

5. The composite material product of claim 3, wherein the volume percentage of the metal is up to 5%.

6. The composite material product of claim 3, wherein the metal(s) is/are in the form of particles dispersed throughout the composite material.

7. A combination of the composite material product of claim 3 and one or more shaped metal rods or plates or meshes for structural reinforcement purposes.

8. A method of improving the mechanical binding of pre-made composite mix elements in forming a composite material comprising the following recycled materials:

from about 40% to 60% by volume of polymers; from about 25% to 50% volume of rubber;

from about 10% to 20% by volume of glass; from about 5% to 15% by volume of sand and/or recycled shingles; and from about 10% to 15% by volume of small gravel and/or coal combustion by-product the total volume percentage of all components in the mixture being 100%; and having a built in elastic strain that provides one or more enhanced composite material physical properties, comprising:

mixing the pre-made composite mix elements;

sand-blasting the elements with an abrasive material during mixing to roughen the component surfaces and improve mechanical binding; and retaining sand blast abrasive material in the mixture to form part of the composite mixture material.

9. A method of forming a composite mixture material, comprising:

comminuting recycled materials including rubber, roof/siding shingles, glass, coal combustion by-product, and polymeric material;

adding particulate material including sand, gravel, small stones, and metals to the comminuted materials;

mixing the comminuted materials and particulate material;

heating the mixed materials to a temperature to melt the polymeric material to form a fused together composite material;

applying a compressive stress load to the composite mixture prior to and during its solidification builds into the mixture an elastic strain which provides the solidified composite mixture a property to compensate against material shrinkage; and forming a solid, densified composite mixture having a memory effect.

10. The method of claim 9, wherein forming the solid mixture comprises cooling the heated mixture naturally and/or artificially.

11. The method of claim 9, wherein the particulate material is from the group consisting essentially of sand, gravel, stones, metals, coal combustion by-product, and ground up concrete and asphalt.

12. The method of claim 9 wherein heating uses hydrogen gas as a combustion fuel.

13. The method of claim 12, wherein substantially only water vapor is formed as a product of combustion of the hydrogen fuel, thereby reducing atmospheric pollution.

14. The method of claim 9 further comprising heating the mixed materials in an inert gas atmosphere to reduce atmospheric pollution and increase the strength of the composite by avoiding oxidation of mixture polymer, plastic and rubber constituents.

15. The method of claim 9 further comprising using a hydrogen fuel cell generator to heat the mixed material.

16. The method of claim 9 further comprising cooling the composite material to form a solid.

17. The method of claim 9 further comprising applying a compressive force to the material while forming the material.

18. The method of claim 9, wherein the polymer material is selected from the group of all recycled polymers.

19. The composite material product of any of claims 1, 3, wherein the composite mixture material is about 50% lighter than concrete and has a tensile modulus and tensile strength greater than concrete.

20. A structural member comprising a wall or panel made of the cured composite mixture material product of claim 1.

21. A pipe or conduit made up of the cured composite mixture material product of claim 1.

22. The method of claim 9, wherein the particulate material is from the group consisting essentially of sand, gravel, roof/siding shingles and coal combustion by-product.

23. The method of claim 11, wherein the concrete and asphalt are recycled materials.

24. The method of claim 9, wherein the recycled materials include least one pre-made solid piece of composite material together with a quantity of loose and heated fill composite material surrounding the at least one solid piece, and further comprising using the heated loose fill to melt a thin surface layer on the at least one pre-made solid pieces such that when the combination is compressed and cooled to a solidification temperature, a solid substantially homogeneous mass is obtained.

25. The method of claim 9, wherein the heating step includes sanitizing the material.

26. A method of improving the strength of the composite mix of claim 8, comprising:

fine-grinding the glass, gravel and coal-combustion by-product constituents to increase their bonding surface area and to reduce the tendency of the constituents to bridge together to form voids in the composite mix material.

27. The product of any of claims 1, 3, excluding binders and chemical adhesives.

28. The product of any of claims 1, 3, wherein the constituents comprise recycled composite mix.

29. The product of any of claims 1, 3, excluding any virgin petroleum distillates and/or other non-recycled chemical additives.

30. The cured compressed composite mixture material product of claim 1, consisting essentially of the following recycled materials:

from about 40% to 60% by volume of polymers;

from about 25% to 50% by volume of rubber;

from about 10% to 20% by volume of glass;

from about 5% to 15% by volume of sand and/or recycled shingles; and from about 10% to 15% by volume of small gravel and/or coal combustion by-product, the total volume percentage of all components in the mixture being 100%.

31. The composite mixture material product of claim 1, wherein the material portions consist essentially of:

about 45% by volume of polymers;

about 25% by volume of rubber;

about 15% by volume of glass;

about 5% by volume of sand and/or recycled shingles; and about 10% by volume of small gravel and/or coal combustion by-product.

32. The cured compressed composite mixture material product of claim 3, consisting essentially of the following recycled materials:

from about 40% to 60% by volume of polymers;

from about 25% to 50% by volume of rubber;

from about 10% to 20% by volume of glass;

from about 5% to 15% by volume of sand and/or recycled shingles;

from about 5% to 15% by volume of small stones and/or gravel and/or coal combustion by-product;

from about 2 to 5% by volume of metal(s); and from about 5% to 10% by volume fiberglass or asphalt shingles;

the total volume percentage of all components being 100%.

33. A structural member comprising the material recited in claim 1.

34. The method of claim 9, wherein the mixture material has no newly added chemicals or petroleum distillates.

35. The cured compressed composite material product of claims 1, 3, wherein the enhanced physical properties of the cured compressed composite material comprise increased composite material shrinkage compensation.

36. The cured compressed composite material product of claims 1, 3, wherein the enhanced physical properties of the cured compressed composite material product comprise composite material expansion enhancement.

37. The cured compressed composite material product of claims 1, 3, wherein the enhanced physical properties of the cured compressed composite material product comprise increased composite material compressive strength.

38. The cured compressed composite material product of claims 1, 3, wherein the enhanced physical properties of the cured compressed composite material comprise a memory effect mechanism to heal indentation damage to the material.

39. A composite mixture material consisting essentially of the following recycled materials:

from about 40% to 60% by volume of polymers;

from about 25% to 50% by volume of rubber;

from about 10% to 20% by volume of glass;

from about 5% to 15% by volume of sand and recycled shingles; and from about 10% to 15% by volume of small gravel and coal combustion by-product, the total volume percentage of all components in the mixture being 100%.

40. A composite mixture material consisting essentially of the following recycled materials:
from about 40% to 60% by volume of polymers;
from about 25% to 50% by volume of rubber;
from about 10% to 20% by volume of glass;
from about 5% to 15% by volume of sand;
from about 5% to 15% by volume of small stones and/or gravel and/or coal combustion by-product;
from about 2 to 5% by volume of metal of at least one type; and
from about 5% to 10% by volume fiberglass or asphalt shingles;
the total volume percentage of all components being 100%.

41. A composite mixture material consisting essentially of the following recycled materials:
from about 40% to 60% by volume of polymers;
from about 25% to 50% by volume of rubber;
from about 10% to 20% by volume of glass;
from about 5% to 15% by volume of sand and/or recycled shingles; and
from about 10% to 15% by volume of small gravel and/or coal combustion by-product, the total volume percentage of all components in the mixture being 100%.

42. A composite mixture material, wherein the material portions consist essentially of:
about 45% by volume of polymers;
about 25% by volume of rubber;
about 15% by volume of glass;
about 5% by volume of sand and/or recycled shingles; and
about 10% by volume of small gravel and/or coal combustion by-product.

43. A composite mixture material, consisting essentially of the following recycled materials:
from about 40% to 60% by volume of polymers;
from about 25% to 50% by volume of rubber;
from about 10% to 20% by volume of glass;
from about 5% to 15% by volume of sand and/or recycled shingles;
from about 5% to 15% by volume of small stones and/or gravel and/or coal combustion by-product;
from about 2 to 5% by volume of metal(s); and
from about 5% to 10% by volume fiberglass or asphalt shingles;
the total volume percentage of all components being 100%.

44. A composite mixture material, consisting essentially of the following recycled materials:
about 50% polymers by volume;
about 40% rubber by volume; and
about 10% glass.

45. A cured composite mixture material product having a built in elastic strain that provides one or more enhanced composite material structural and energy absorbing properties missing from the composite material without the built-in elastic strain, comprising the following recycled materials:
from about 40% to 60% by volume of polymers; from about 25% to 50% by volume of rubber;
from about 10% to 20% by volume of glass; from about 5% to 15% by volume of sand and/or recycled shingles; and
from about 10% to 15% by volume of small gravel and/or coal combustion by-product, the total volume percentage of all components in the mixture being 100%; and
said product has a structure which retains a built-in elastic strain that exhibits one or more enhanced physical properties.

46. A compressed composite mixture material, consisting of the following recycled materials:
from about 40% to 60% by volume of polymers;
from about 25% to 50% by volume of rubber;
from about 10% to 20% by volume of glass;
from about 5% to 15% by volume of sand and recycled shingles; and
from about 10% to 15% by volume of small gravel and coal combustion by-product, the total volume percentage of all components in the mixture being 100%.

47. A composite mixture material consisting of:
about 45% by volume of polymers;
about 25% by volume of rubber;
about 15% by volume of glass;
about 5% by volume of sand and recycled shingles; and
about 10% by volume of small gravel and coal combustion by-product.

48. A compressed composite mixture material comprising:
from about 40% to 60% by volume of polymers;
from about 25% to 50% by volume of rubber;
from about 10% to 20% by volume of glass;
from about 5% to 15% by volume of sand and/or recycled shingles;
from about 5% to 15% by volume of small stones and/or gravel and/or coal combustion by-product;
from about 2 to 5% by volume of metal(s);
from about 5% to 10% by volume fiberglass or asphalt shingles; and
containing no petroleum or petroleum by-products other than trace amounts thereof; and wherein
the total volume percentage of all components is 100%.

49. A composite material consisting of:
about 45% by volume of polymers;
about 25% by volume of rubber;
about 15% by volume of glass;
about 5% by volume of sand and/or recycled shingles; and
about 10% by volume of small gravel and/or coal combustion by-product.

50. A compressed composite mixture material consisting of:
from about 40% to 60% by volume of polymers;
from about 25% to 50% by volume of rubber;
from about 10% to 20 % by volume of glass;
from about 2% to 5% by volume of metal(s);
from about 5% to 10% by volume of fiberglass or asphalt shingles; and
wherein the total volume percentage of all components is 100%.

51. A composite mixture material consisting of:
about 45% by volume of polymers;
about 25% by volume of rubber;
about 15% by volume of glass;
about 5% by volume of sand and/or recycled shingles; and
about 10% by volume of small gravel and/or coal combustion by-product.

52. A compressed composite mixture material consisting of:
from about 40% to 60% by volume of polymers;
from about 25% to 50% by volume of rubber;
from about 10% to 20% by volume of glass;
from about 5% to 15% by volume of sand and/or recycled shingles;
from about 5% to 15% by volume of small stones and/or gravel and/or coal combustion by-product;
from about 2 to 5% by volume of metal(s);

from about 5% to 10% by volume fiberglass or asphalt shingles; and wherein the total volume percentage of all components is 100%.

53. The compressed composite mixture material having a built in elastic strain that provides one or more enhanced composite material physical properties of claim 1, wherein the enhanced physical properties comprise at least one of (1) polymer shrinkage compensation; (2) thermal contraction compensation, (3) memory and self-healing characteristics, and (4) enhanced impact strength tolerance.

54. The method of claim 9, further comprising:

re-heating the mixed materials to a temperature to melt the polymeric material to form a fused together composite material;

re-applying a compressive stress load to the composite mixture prior to and during its solidification builds into the mixture an elastic strain which provides the solidified composite mixture a property to compensate against material shrinkage; and re-forming a solid, densified composite mixture having a memory effect.

55. A composite mixture material made by the process of claim 8.

56. A composite mixture material made by the process of claim 9.

57. The compressed composite mixture material of claim 56, wherein the compressive stress load to the composite mixture prior to and during its solidification to build into the mixture an elastic strain (S) is applied according to the following equation:

$$S=E_R[\alpha_C L\Delta T+\alpha_M W\Delta T+F_S W]M_1/WF_R\mu_R$$ where;

$E_R$ is the modulus of elasticity of a specific component of the composite mixture material;

$\alpha_C$ $L\Delta T$ is the thermal contraction of the pavement;

$\alpha_M$ $W\Delta T$ is the thermal contraction of the composite mix, $F_S$ W is the shrinkage of the composite material fill in the expansion joint;

$M_1$ is a Safety Factor Multiplier;

$F_R$ is the fraction of said specific component of the composite material fill in the expansion joint;

W is the width of the pavement expansion joint filled by composite material; and $\mu\lambda_R$ is the poison ratio of said specific component of the composite material fill in the expansion joint.

* * * * *